United States Patent
Hong et al.

(10) Patent No.: US 10,452,722 B2
(45) Date of Patent: Oct. 22, 2019

(54) PROCESSING ELECTRONIC DATA IN COMPUTER NETWORKS WITH RULES MANAGEMENT

(71) Applicants: Jiang Hong, San Jose, CA (US); Candice Lin, Cupertino, CA (US); Yuwen Wu, Campbell, CA (US); Yi Ding, Saratoga, CA (US); Pingping Pan, Sunnyvale, CA (US)

(72) Inventors: Jiang Hong, San Jose, CA (US); Candice Lin, Cupertino, CA (US); Yuwen Wu, Campbell, CA (US); Yi Ding, Saratoga, CA (US); Pingping Pan, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 121 days.

(21) Appl. No.: 15/132,064

(22) Filed: Apr. 18, 2016

(65) Prior Publication Data
US 2017/0300821 A1    Oct. 19, 2017

(51) Int. Cl.
*G06K 9/00* (2006.01)
*G06F 16/93* (2019.01)
*G06N 3/04* (2006.01)

(52) U.S. Cl.
CPC .............. *G06F 16/93* (2019.01); *G06N 3/04* (2013.01); *G06K 9/00442* (2013.01)

(58) Field of Classification Search
CPC .... G06N 5/046; G06N 3/04; G06F 17/30011; G06F 16/93; G06K 9/18; G06K 9/6267; G06K 9/66; G06K 9/00442
See application file for complete search history.

(56) References Cited

U.S. PATENT DOCUMENTS

| 6,594,351 B1* | 7/2003 | Bhogal | H04N 1/32005 358/434 |
| 6,850,908 B1* | 2/2005 | Smith, II | G06Q 10/10 382/173 |

(Continued)

OTHER PUBLICATIONS

Sato, U.S. Appl. No. 15/044,941, filed Feb. 16, 2016, Office Action dated May 24, 2018.

(Continued)

*Primary Examiner* — Sean T Motsinger
(74) *Attorney, Agent, or Firm* — Hickman Palermo Becker Bingham LLP; Edward A. Becker

(57) ABSTRACT

An approach is provided for managing processing rules used to process electronic data in computer networks. An application provides the capability for users to define and manage classifications for electronic data. The application also provides the capability for users to define and manage processing rules for each classification. This may include specifying, for each processing rule, a classification to which the processing rule corresponds, one or more conditions under which the processing rule is to be applied and optionally, not applied, a priority for the processing rule, and one or more actions to be performed. The priority may be used to determine which rule is to be applied when more than one rule corresponds to a classification. The application supports the definition and management of classifications and rules on a logical group-by-logical group basis.

14 Claims, 26 Drawing Sheets

(56) References Cited

U.S. PATENT DOCUMENTS

| | | | | |
|---|---|---|---|---|
| 7,561,734 B1* | 7/2009 | Wnek | G06F 17/243 | 382/159 |
| 7,900,146 B2* | 3/2011 | Kozuka | G03G 15/5016 | 358/1.13 |
| 2003/0085162 A1 | 5/2003 | Daniels | | |
| 2003/0120593 A1* | 6/2003 | Bansal | G06F 17/30873 | 705/39 |
| 2005/0004885 A1* | 1/2005 | Pandian | G06F 17/30557 | |
| 2005/0209867 A1* | 9/2005 | Diesch | G06Q 10/10 | 705/1.1 |
| 2005/0210048 A1* | 9/2005 | Beres | G06F 17/30569 | |
| 2006/0217959 A1* | 9/2006 | Saito | G06F 17/274 | 704/2 |
| 2007/0150387 A1* | 6/2007 | Seubert | G06Q 10/10 | 705/31 |
| 2007/0168382 A1* | 7/2007 | Tillberg | G06F 17/30253 | |
| 2007/0217715 A1* | 9/2007 | Newcomer | G06K 9/00469 | 382/305 |
| 2008/0147790 A1* | 6/2008 | Malaney | G06Q 10/00 | 709/203 |
| 2008/0239365 A1* | 10/2008 | Salgado | G06F 17/212 | 358/1.15 |
| 2009/0138466 A1* | 5/2009 | Henry | G06F 17/30017 | |
| 2009/0222490 A1* | 9/2009 | Kemp | G06F 17/30011 | |
| 2009/0228777 A1* | 9/2009 | Henry | G06F 17/30017 | 715/230 |
| 2009/0296166 A1* | 12/2009 | Schrichte | G06Q 10/10 | 358/474 |
| 2010/0046015 A1* | 2/2010 | Whittle | G06F 3/1222 | 358/1.9 |
| 2010/0229246 A1* | 9/2010 | Warrington | G06F 21/6218 | 726/28 |
| 2010/0241603 A1* | 9/2010 | Voskuil | G06N 5/022 | 706/47 |
| 2010/0245938 A1* | 9/2010 | Coley | G06F 17/30011 | 358/474 |
| 2010/0318538 A1* | 12/2010 | Wyman | G06F 17/30011 | 707/759 |
| 2012/0204103 A1* | 8/2012 | Stevens | G06Q 10/10 | 715/273 |
| 2013/0254297 A1 | 9/2013 | Kobayashi | | |
| 2015/0278699 A1* | 10/2015 | Danielsson | G06F 8/313 | 706/47 |
| 2016/0049010 A1* | 2/2016 | Hinski | G06F 17/30011 | 345/633 |
| 2016/0122148 A1* | 5/2016 | Westcott | B65H 31/24 | 358/488 |
| 2016/0125680 A1* | 5/2016 | White | G07C 9/00103 | 235/380 |
| 2017/0103230 A1* | 4/2017 | O'Brien | G06F 21/6245 | |
| 2017/0142274 A1* | 5/2017 | Koyanagi | G06K 9/00456 | |
| 2017/0220535 A1* | 8/2017 | Olsen | G06F 17/2282 | |
| 2017/0237868 A1 | 8/2017 | Sato et al. | | |
| 2017/0255680 A1 | 9/2017 | Malatesha et al. | | |
| 2017/0255876 A1 | 9/2017 | Malatesha et al. | | |

OTHER PUBLICATIONS

Malatesha, U.S. Appl. No. 15/060,352, filed Mar. 3, 2016, Office Action dated May 10, 2018.

Sato, U.S. Appl. No. 15/044,941, filed Feb. 16, 2016, Notice of Allowance dated Oct. 31, 2018.

Malatesha, U.S. Appl. No. 15/060,352, filed Mar. 3, 2016, Notice of Allowance dated Oct. 1, 2018.

Malatesha, U.S. Appl. No. 15/060,347, filed Mar. 3, 2016, Office Action dated Nov. 26, 2018.

Malatesha, U.S. Appl. No. 15/060,347, filed Mar. 3, 2016, Final Office Action dated Apr. 5, 2019.

* cited by examiner

FIG. 3B

| User LoginID | Name | Email | Role |
|---|---|---|---|
| admin | admin | admin@abc.com | SuperAdmin |
| 1user | 1user | user1@yahoo.com | Admin |

User Management

1 - 2 of 2 items 20 items per page

FIG. 3G

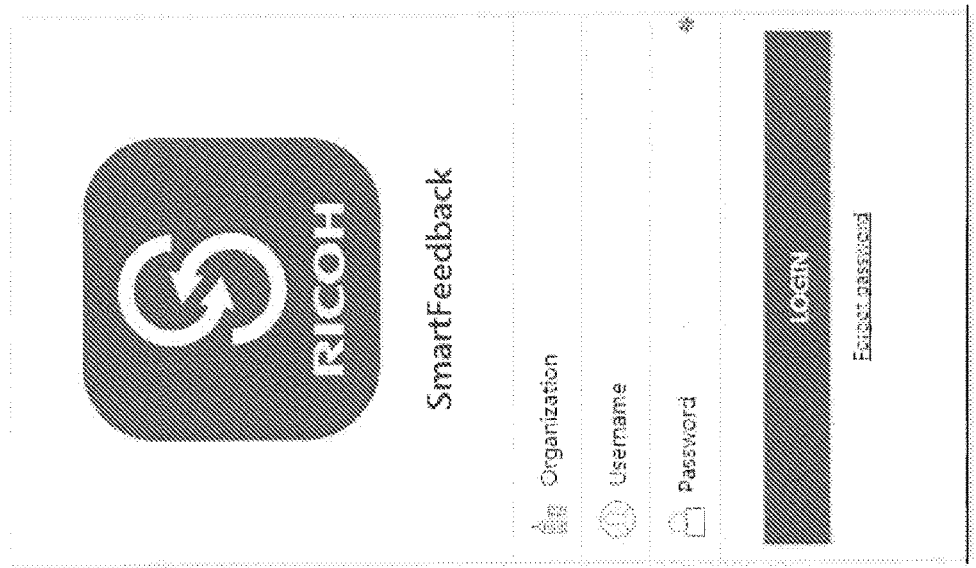
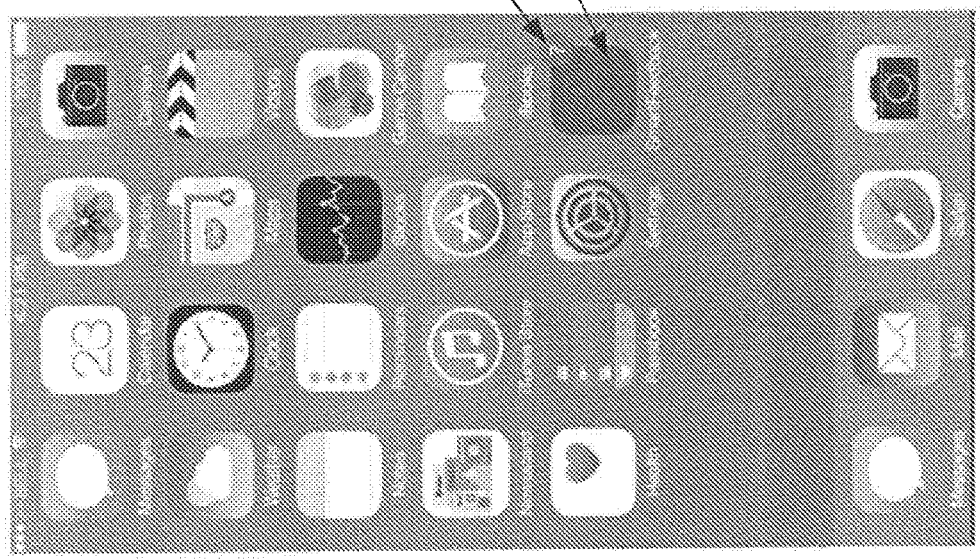
FIG. 4B
FIG. 4A

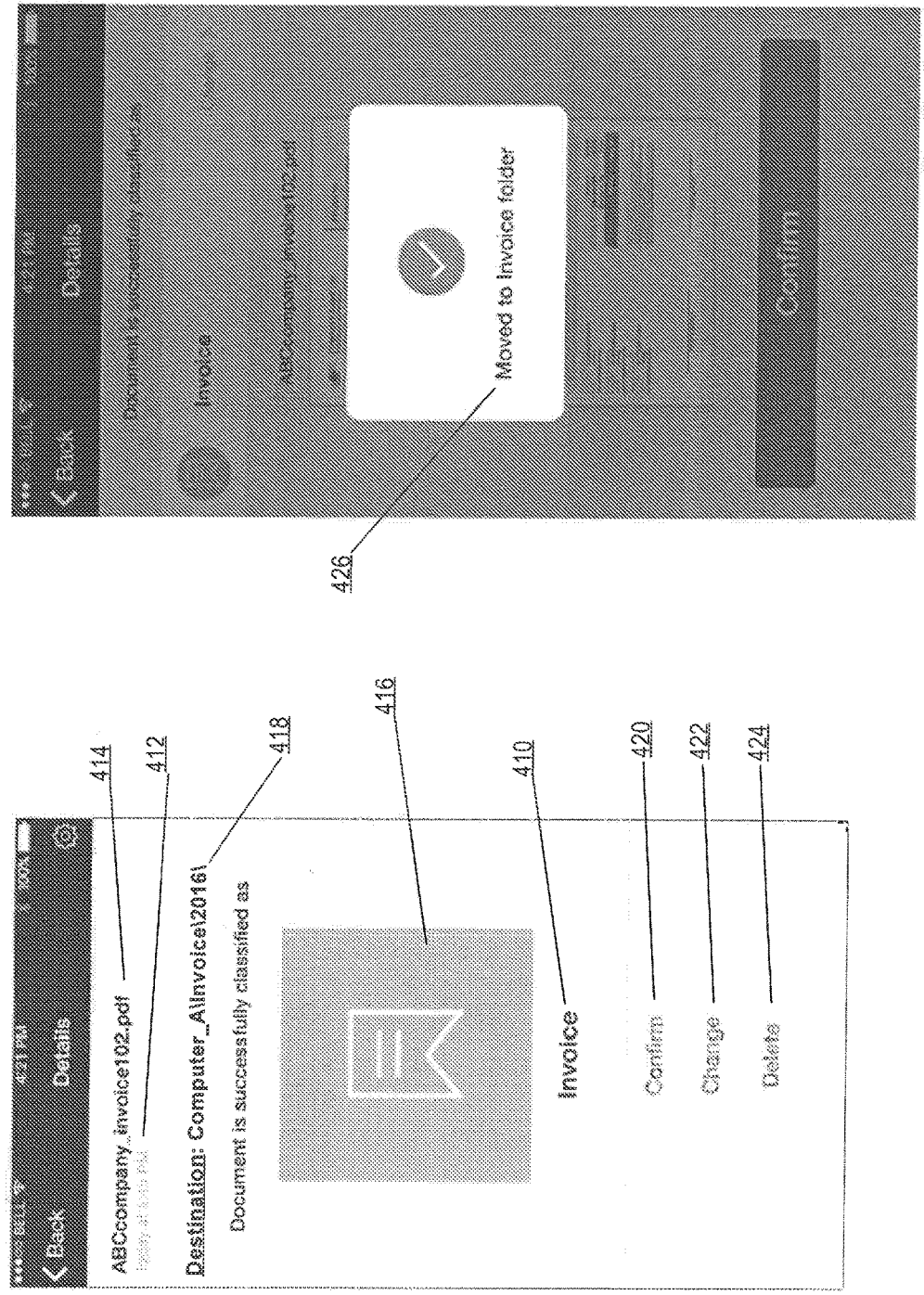

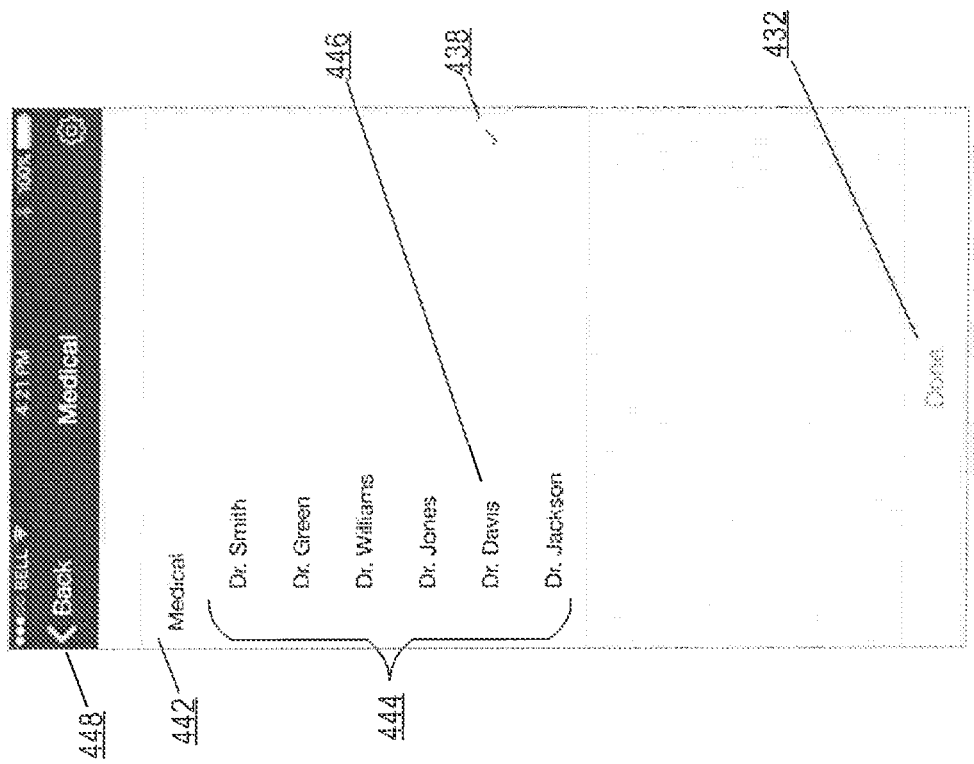

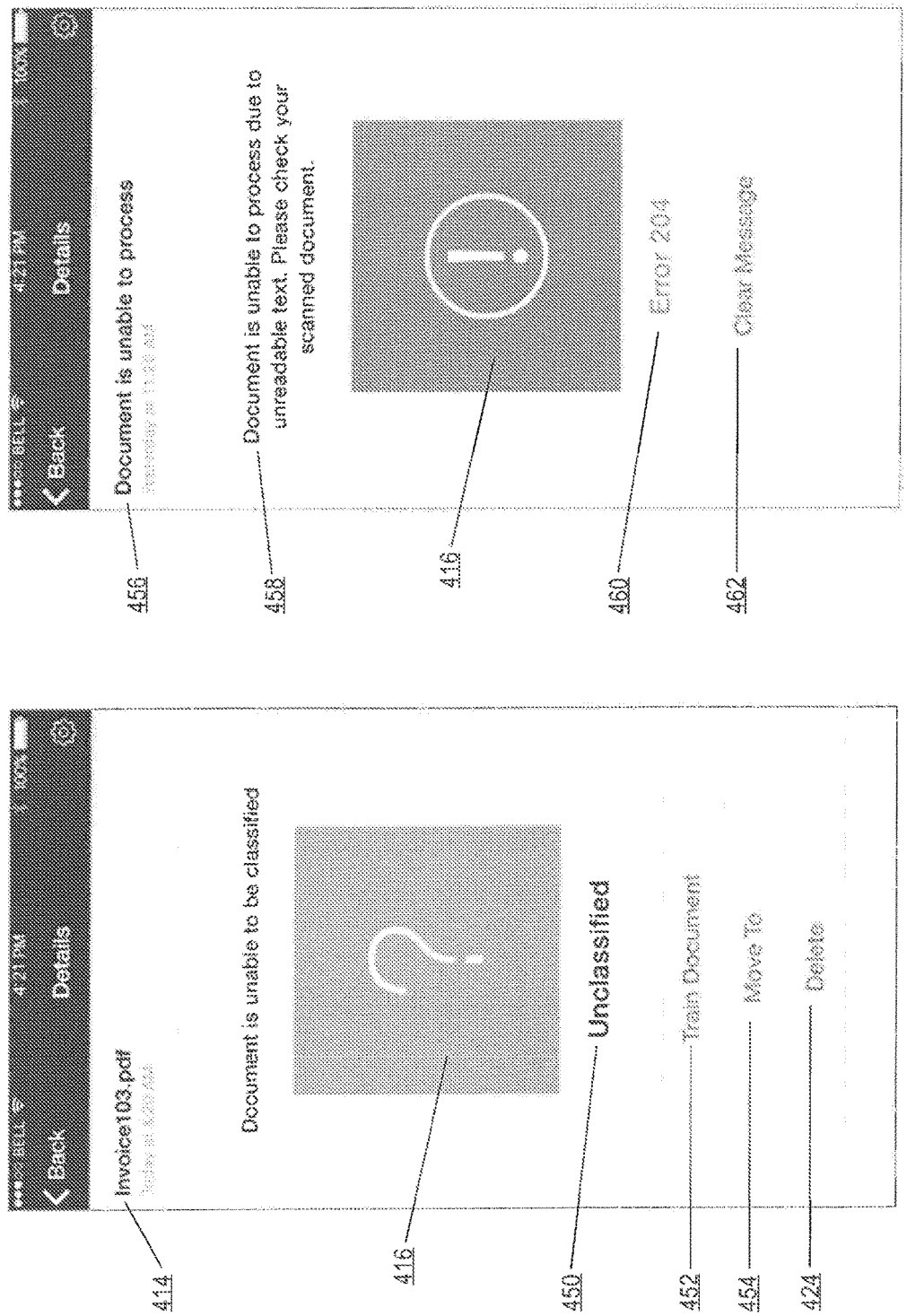

PROCESSING ELECTRONIC DATA IN COMPUTER NETWORKS WITH RULES MANAGEMENT

RELATED APPLICATION DATA

This application is related to U.S. patent application Ser. No. 15/044,941 entitled "SYSTEM AND METHOD FOR ANALYZING, NOTIFYING, AND ROUTING DOCUMENTS," filed Feb. 16, 2016; to U.S. patent application Ser. No. 15/060,347 941 entitled "RICOH ASSIST™ AN INTELLIGENT SYSTEM FOR AUTOMATIC ROUTING AND CLASSIFICATION," filed Mar. 3, 2016; and to U.S. patent application Ser. No. 15/060,352 entitled "RICOH ASSIST™ AN INTELLIGENT SYSTEM FOR AUTOMATIC ROUTING AND CLASSIFICATION," filed on Mar. 3, 2016.

FIELD OF THE DISCLOSURE

This application relates generally to processing of electronic data in computer networks and more specifically, to an approach for managing rules used to process electronic data in computer networks. SUGGESTED GROUP ART UNIT: 2625; SUGGESTED CLASSIFICATION: 358

BACKGROUND

Electronic data processing can be an inefficient process. For example, electronic documents received through facsimile are often printed at the facsimile device or stored in a data repository. This can be cumbersome for large numbers of electronic documents, and in the case of a scan operation, a user may not always know the correct destination for the scan data. Additionally, in the case of a large number of scanned documents, it may be inefficient for a user to manually select each destination for each document.

SUMMARY

An approach is provided for processing electronic data and managing rules used to process the electronic data in computer networks. The approach includes receiving, by an application executing on a computing device, OCR data for an electronic document and classifying, by the application, based upon contents of the OCR data, the electronic document to determine a classification for the electronic document. A determination is made, by the application, of a processing rule that corresponds to the classification for the electronic document. An identification is made, by the application, an action specified by the processing rule that corresponds to the classification for the electronic document; and the action is performed on the electronic data by the application. The approach may be implemented as a computer-implemented method, by instructions stored on one or more non-transitory computer-readable media when executed by one or more processors, or by one or more apparatuses.

BRIEF DESCRIPTION OF THE DRAWINGS

In the figures of the accompanying drawings like reference numerals refer to similar elements.

FIG. 3B depicts an example user management screen that allows an administrative user to manage administrative users, including adding new administrative users, editing existing administrative users, and deleting existing administrative users according to an embodiment.

FIG. 3G depicts an example user management screen that allows an administrative user to manage rule users, including adding, editing, and rule users according to an embodiment.

FIG. 3O depicts an example rule properties screen that allows a user to specify rule properties including a name, priority, action and description according to an embodiment.

FIG. 4A depicts a home screen for mobile device including a smart feedback icon that represents a SmartFeedback application according to an embodiment.

FIG. 4B depicts a sample user login screen for a SmartFeedback application according to an embodiment.

FIG. 4D depicts an example document details screen according to an embodiment.

FIG. 4E depicts an embodiment of SmartFeedback application notifying the user that the user confirmation has been sent to SmartFeedback application and the particular document has been moved to the appropriate destination folder.

FIG. 4H depicts an example set of sub-classifications for sub-classification medical, labelled as medical sub-classifications according to an embodiment.

FIG. 4I depicts an example screenshot of user options when viewing the document details screen of an unclassified document according to an embodiment.

FIG. 4J depicts an example document details page where the pending document was flagged as an error according to an embodiment.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various embodiments are described hereinafter in the following sections:

I. Overview
II. Electronic Data Processing Architecture
III. User and Organization Management
IV. Storage Management
V. Classification and Rule Management
VI. Inbox Management
VII. Smart Feedback
  A. User Confirmation
  B. User Change Request
  C. User Delete Request
  D. User Training Request
  E. Document Error
  F. Machine Learning
VIII. Implementation Examples

I. OVERVIEW

An approach is provided for managing processing rules used to process electronic data in computer networks. A SmartFeedback application provides the capability for users to define and manage classifications for electronic data. The SmartFeedback application also provides the capability for users to define and manage processing rules for classifications. This may include specifying, for each processing rule, a classification to which the processing rule corresponds, one or more conditions under which the processing rule is to be applied and optionally, not applied, a priority for the processing rule, and one or more actions to be performed. The priority may be used to determine which rule is to be applied when more than one rule corresponds to a classification. The one or more actions may include a wide variety of actions, such as storing electronic data to a specified location, performing specified processing on electronic data, and transmitting electronic data to one or more processes for processing. The SmartFeedback application supports the definition and management of classifications and rules on a logical group-by-logical group basis. This provides great flexibility for organizations to define and manage classifications and rules on multiple levels, for example, at the organization, department, project and user level.

II. ELECTRONIC DATA PROCESSING ARCHITECTURE

Figure 1:
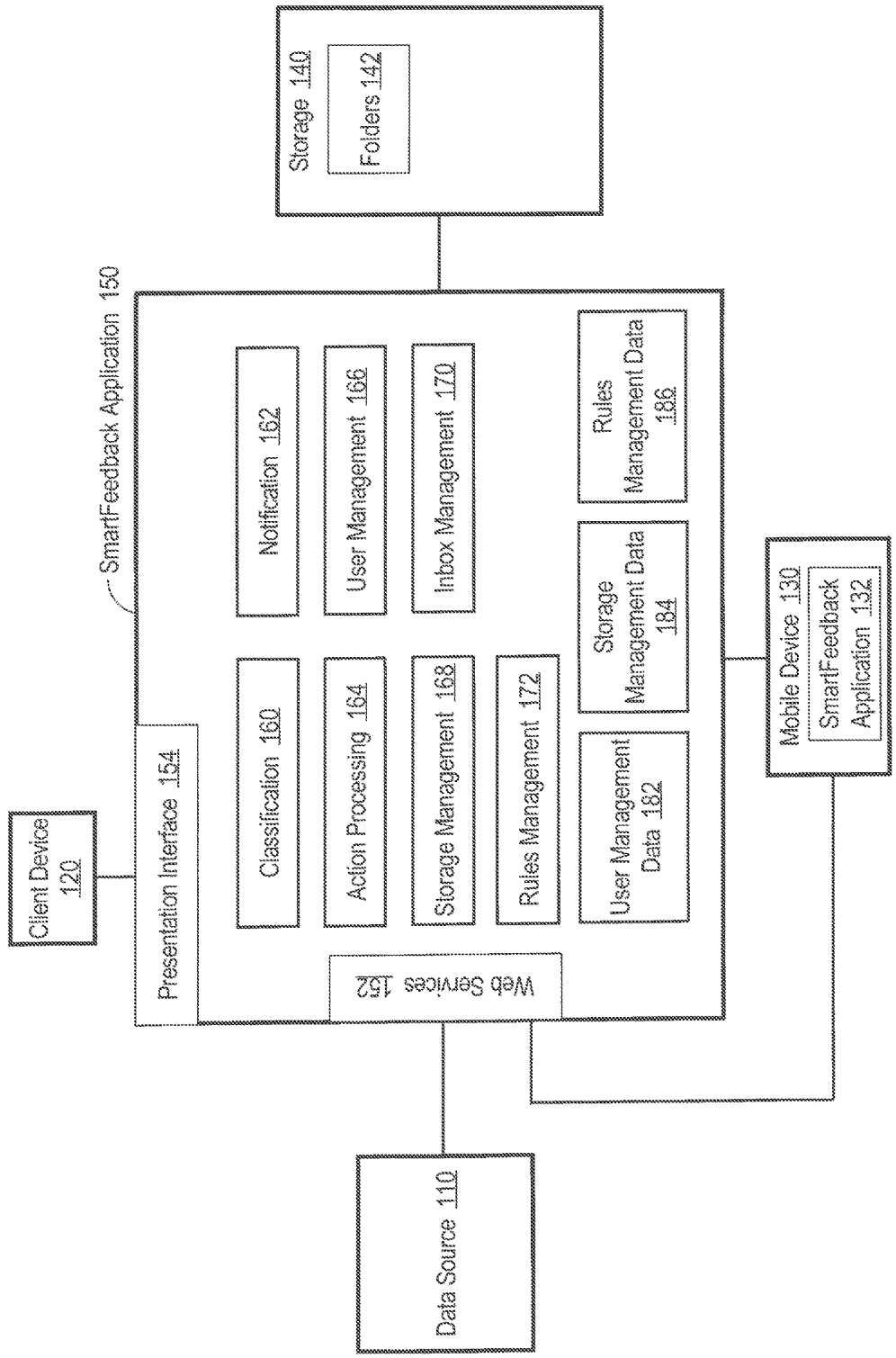
FIG. 1 depicts an example arrangement processing electronic data in computer networks according to an embodiment.

FIG. 1 depicts an example arrangement 100 processing electronic data in computer networks according to an embodiment. The processing of electronic data may include different types of action processing that are described in more detail hereinafter. One example of action processing that may be performed on electronic data is routing and storage of electronic data. Arrangement 100 includes a data source 110, a client device 120, a mobile device 130, storage 140, and a SmartFeedback application 150. All of the elements of arrangement 100 may be communicatively coupled via one or more communications links, including, without limitation, one or more networks, such as one or more Local Area Networks (LANs), one or more Wide Area Networks (WANs), one or more Ethernets or the Internet, or one or more terrestrial, satellite or wireless links. The elements of arrangement 100 may also communicate via direct (wired or wireless) communications links, depending upon a particular implementation. Arrangement 100 may include additional or fewer elements, depending upon a particular implementation, and embodiments are not limited to the example elements depicted in FIG. 1.

Data source 110 is a source of electronic data processed by arrangement 100. Electronic data may be any type of electronic data, for example, scan data, electronic documents, etc. Examples of data source 110 include, without limitation, client devices, such as workstations, desktop computers, laptop computers, tablet computing devices, personal digital assistants (PDAs), multifunction peripherals (MFPs), etc. Data source 110 includes the capability to transmit data to SmartFeedback application 150 using, for example, an application program interface (API) provides by Web services 152. Data source 110 may be configured to provide data to SmartFeedback application 150 in different formats. For example, data source 110 may be an MFP configured with OCR capability to provide text data to SmartFeedback application 150. Alternatively, data source 110 may be configured to use external OCR services to provide text data to SmartFeedback application 150.

Client device 120 is a device that allows a user to access functionality, such as user management 166, storage management 168, inbox management 170, and rules management 172, that are described in more detail hereinafter. Client device 120 may be any type of computing device and embodiments are not limited to any particular implementation of client device 120. Examples of client device 120 include, without limitation, workstations, desktop computers, laptop computers, tablet computing devices, PDAs, etc. Client device 120 may access functionality of SmartFeedback application 150 via a presentation interface 154, which may be implemented as a Web interface that is accessible via a Web browser executing on client device 120.

Mobile device 130 is a computing device that has the capability to receive and display classification results, also referred to herein as "feedback," for electronic data from SmartFeedback application 150. The display classification results identify one or more classifications that have been determined for the electronic data. The display classification results may be received by mobile device 130 in a wide variety of forms, for example, as an email, message or other notification. Mobile device 130 also provides the capability to allow a user to confirm, change or delete a classification determined for electronic data. Mobile device 130 further provides the capability to allow a user to add one or more classifications for electronic data for which a classification has not been determined and to confirm or change one or more actions to be performed on electronic data in accordance with a processing rule. Mobile device 130 may be implemented by any type of computing device, such as a smartphone (IOS, Android based, etc.), tablet computing device, PDA, laptop computer, etc. Although embodiments are described herein in the context of mobile device 130 being a mobile computing device, this is not required and embodiments are applicable to non-mobile computing devices such as workstations, desktop computing devices, etc. According to one embodiment, mobile device 130 is configured with a SmartFeedback application 132 that executes on mobile device 130 and provides the functionality described hereinafter including, for example, the capability to allow users to manage classifications and processing rules.

Storage 140 is any type of storage that includes the capability to store electronic data. Examples of storage 140 include, without limitation, any type of volatile or non-volatile storage. As described in more detail hereinafter, storage 140 may be used to organize and store electronic data that has been classified. For example, storage 140 may include one or more folders 142 and electronic data items, such as files, may be stored in folders 142 after being classified. The storing of electronic data to storage 140 may be one of several types of actions that are performed on electronic data in response to the application of one or more processing rules associated with one or more classifications determined for the electronic data.

SmartFeedback application 150 processes electronic data in accordance with one or more processing rules defined for electronic data classifications. SmartFeedback application 150 may be implemented via computer hardware, computer software, or various combinations of computer hardware and computer software. As one non-limiting example, SmartFeedback application 150 may be implemented as one or more processes, such as a Web-based application within a container, such as a Jetty or Tomcat Web server, executing on one or more computing devices. The constituent elements of SmartFeedback application 150 are depicted in the figures and described herein as being part of SmartFeedback application 150 for purposes of explanation, but one or more of these elements may be implemented external to SmartFeedback application 150.

As depicted in FIG. 1, SmartFeedback application 150 may provide various functionality including, for example, classification 160, notification 162, action processing 164, user management 166, storage management 168, inbox management 170, and rules management 172. Classification 160 involves analyzing electronic data and generating classification results that specify one or more classifications that apply to the electronic data. Classification 160 may be performed using one or more classification algorithms, heuristics, etc., provided, for example, by a classification engine, to analyze the content of electronic data and determine one or more classifications that are appropriate for the electronic data, given the content of the electronic data. Classification 160 may include the use of resources external to SmartFeedback application 150. A wide variety of classifications may be used, depending upon a particular implementation, and embodiments are not limited to any particular types of classifications. Example classifications include, without limitation, a type, a subject, etc., such as invoice, employee, insurance, etc. Classifications may be used during subsequent processing of electronic data, for example, to determine how the electronic data is to be processed. According to one embodiment, after electronic data has been classified and one or more classifications determined for the electronic data, one or more processing rules that correspond to the one or more classifications are identified. Each processing rule may define criteria for applying and/or not applying the rule, one or more actions to be performed, and optionally a priority to be used to determine which rule is to be applied in situations where electronic data satisfies the criteria for multiple processing rules. As described in more detail hereinafter, processing rules may be defined and applied on a logical group-by-logical group basis. As used herein, the term "logical group" refers to any logical entity. Examples of logical entities include, without limitation, business or social organizations, groups, projects and individual users.

Notification 162 includes generating and transmitting to mobile device 130 notifications that specify classification results, or feedback, for electronic data. The classification results specify one or more classifications determined for the electronic data. In situations where no classification could be determined for electronic data, then the notification may indicate that no classification could be determined. Notifications may be in a wide variety of formats that may vary depending upon a particular implementation. For example, notifications may be in the form of emails, messages or other notification formats.

Action processing 164 includes performing one or more actions specified by processing rules that correspond to one or more classifications for electronic data. According to one embodiment, as described in more detail hereinafter, each processing rule specifies one or more actions to be performed on electronic data. Embodiments are applicable to any type of action and actions may vary, depending upon a particular implementation. Example actions include, without limitation, storing electronic data to storage 140 and/or another location, transmitting electronic data to another location and performing various processing on electronic data.

User management 166 includes managing users of SmartFeedback application 150, including adding and deleting users and specifying roles and permissions of users of SmartFeedback application 150.

Storage management 168 includes functionality for managing the storage 140 including, for example, managing the logical structures, such as file folders. Inbox management 170 includes managing notification messages pertaining to classification of electronic data.

Rules management 172 includes creating, i.e., defining, editing and deleting processing rules for electronic data classifications. As described in more detail hereinafter, each processing rule may define criteria for applying and/or not applying the rule, one or more actions to be performed, and optionally a priority to be used to determine which rule is to be applied in situations where electronic data satisfies the criteria for multiple processing rules.

Figure 2:
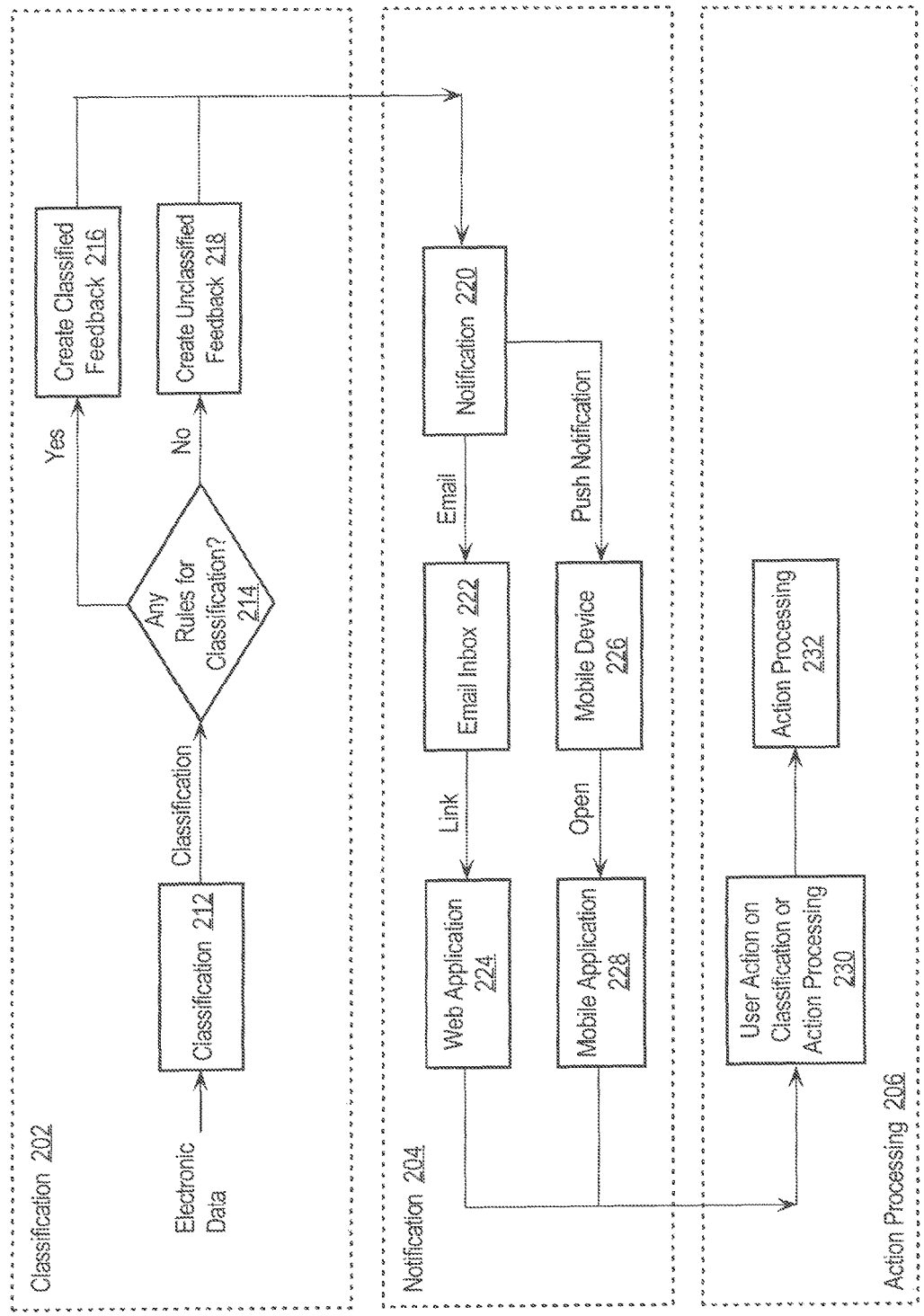
FIG. 2 depicts example processing flow performed by an arrangement when processing electronic data according to an embodiment.

FIG. 2 depicts example processing flow 200 performed by arrangement 100 when processing electronic data according to an embodiment. The processing flow 200 includes three processing phases that include classification 202, notification 204 and action processing 206. Starting with the classification processing 202 phase, in step 212, classification is performed on electronic data. In the present example, it is presumed that an electronic document, in the form of an invoice, has been scanned by a scanner to generate scan data that represents the invoice, and that the scan data is the electronic data. It is further presumed that the electronic data has been provided to SmartFeedback application 150, for example, by data source 110 via Web services 152. Optical character recognition (OCR) may be performed on the electronic data external to SmartFeedback application 150, or as part of, or prior to, classification 212. The classification processing 212 determines one or more classifications for the electronic data. In the present example, it is presumed that the classification 212 processing classifies the electronic data as corresponding to an invoice classification. Embodiments are not limited to electronic data corresponding to a single classification and electronic data may be determined to correspond to multiple classifications.

In step 214, a determination is made whether any rules exist for the classification. In the present example, classification 160 determines, based upon rules data 180, whether there are any processing rules that correspond to the classification. If one or more processing rules correspond to the classification, then in step 216, classified feedback is generated. In the event that more than one processing rule corresponds to the classification, then priorities may be used to select a single classification, as described in more detail hereinafter. The classification feedback, also referred to herein as classification results, specifies the classification that corresponds to the electronic data. If no one or more processing rules correspond to the classification, then in step 216, unclassified feedback is generated that specifies that the electronic data could not be successfully classified.

The notification phase 204 starts with step 220, in which a notification of the classification results, or feedback, is generated. Many different types of notifications may be made and embodiments are not limited to any particular type of notification. In the example depicted in FIG. 2, in step 222, an email notification is generated and sent to the user's email inbox. The email contains a link which, when processed by a Web application in step 224, causes the classification results, or feedback, to be retrieved and displayed, for example, in a Web page. Alternatively, in step 226, a notification is pushed to mobile device 130, for example in the form of a message, and in step 228, the user views the notification via a mobile application on mobile device The action processing 206 phase starts with step 230, in which a user action is performed on the classification, the action processing to be performed, or both. As described in more detail hereinafter, when presented with the notification specifying the classification determined for the electronic data, the user may confirm, change or delete an existing classification, or add a classification if none was specified. In the present example, the user may confirm the invoice classification determined in step 212, change the classification from invoice to a different classification, or delete the invoice classification. According one embodiment, the user may also confirm, change or delete action processing that corresponds to the classification. For example, suppose that the processing rule that corresponds to the invoice classification specifies an action to save the electronic data (invoice) to a particular folder on storage 140. The user may change the storage location to a different folder on storage 140, or may specify a different type of action to be performed instead of storing the electronic data on storage 140. In step 232, the action processing is performed, which is either the action specified by the processing rule for the classification and confirmed by the user, or an alternative action specified by the user. Alternatively, no action processing is performed if no rules were specified for the classification and the user did not change the classification or specify an action.

III. USER AND ORGANIZATION MANAGEMENT

Figure 3A:
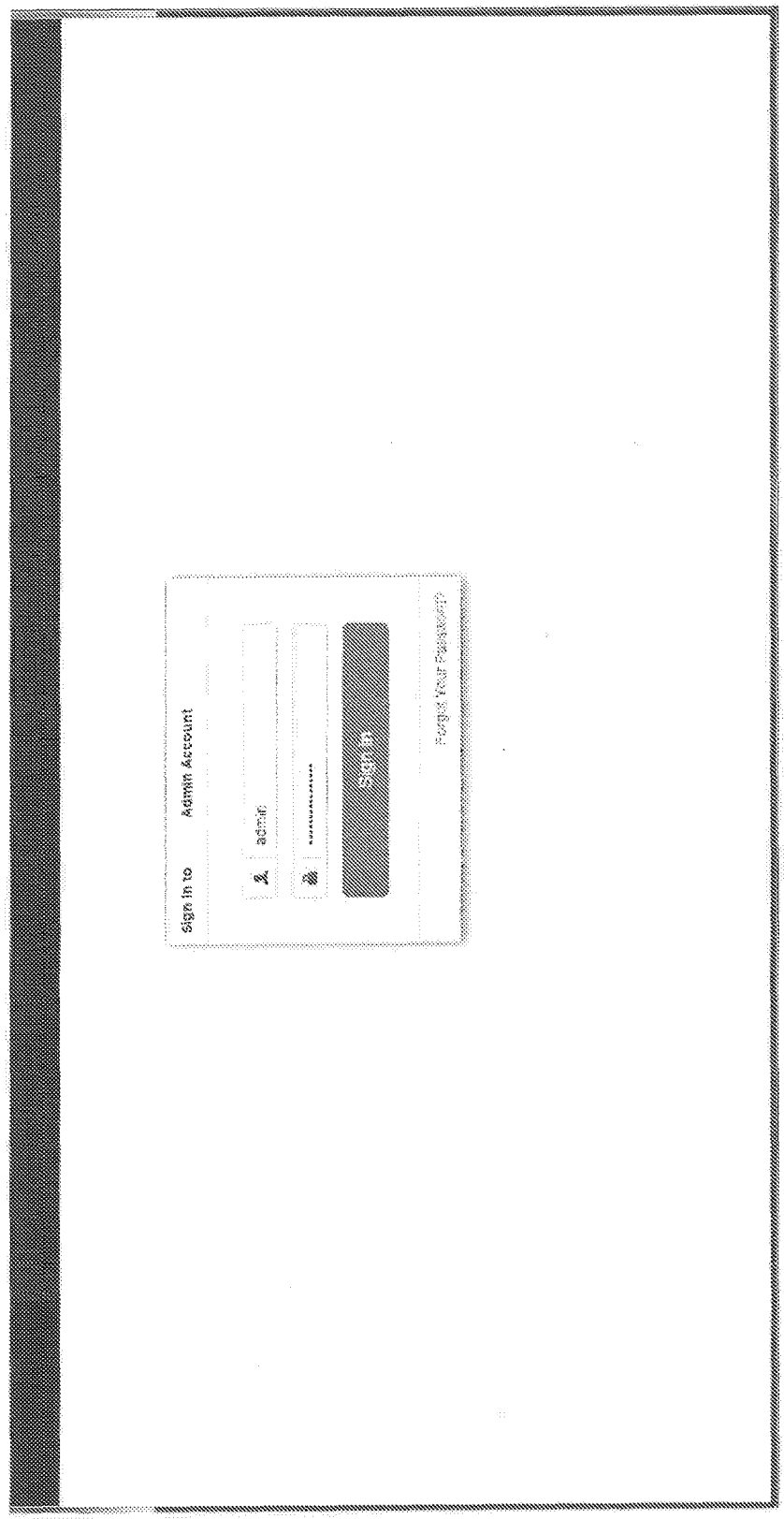
FIG. 3A depicts an example login screen for an administrative user that provides access to the user management functionality provided by SmartFeedback application according to an embodiment.

SmartFeedback application 150 supports various user and organization management functionality, including adding and deleting users and organizations, and specifying roles and permissions of users of SmartFeedback application 150. According to one embodiment, the presentation interface 154 provided by SmartFeedback application 150 is a Web-based user interface accessible via a Web browser executing on client device 120. FIG. 3A depicts an example login screen for an administrative user that provides access to the user management functionality provided by SmartFeedback application 150 according to an embodiment. The administrator user may be, for example, an administrative user of a business organization. In this example, the administrative user is queried for user credentials including a username and password. FIG. 3B depicts an example user management screen that allows an administrative user to manage other users, including adding new users, editing existing users, and deleting existing users according to an embodiment. In the example depicted in FIG. 3B, each user has an assigned user login ID, name, email address and role, that may be changed by the administrative user. The particular roles that are used may vary depending upon a particular implementation and embodiments are not limited to any particular roles. Example roles include without limitation, super administrative user, administrative user and rule user. Super administrative users are typically created when an organization is created and have the highest level of authority, including the authority to create administrative users and rule users. Administrative users have the authority to create and manage rule users. Rule users have the lowest level of authority and are permitted to create and manage rules.

Figure 3C:
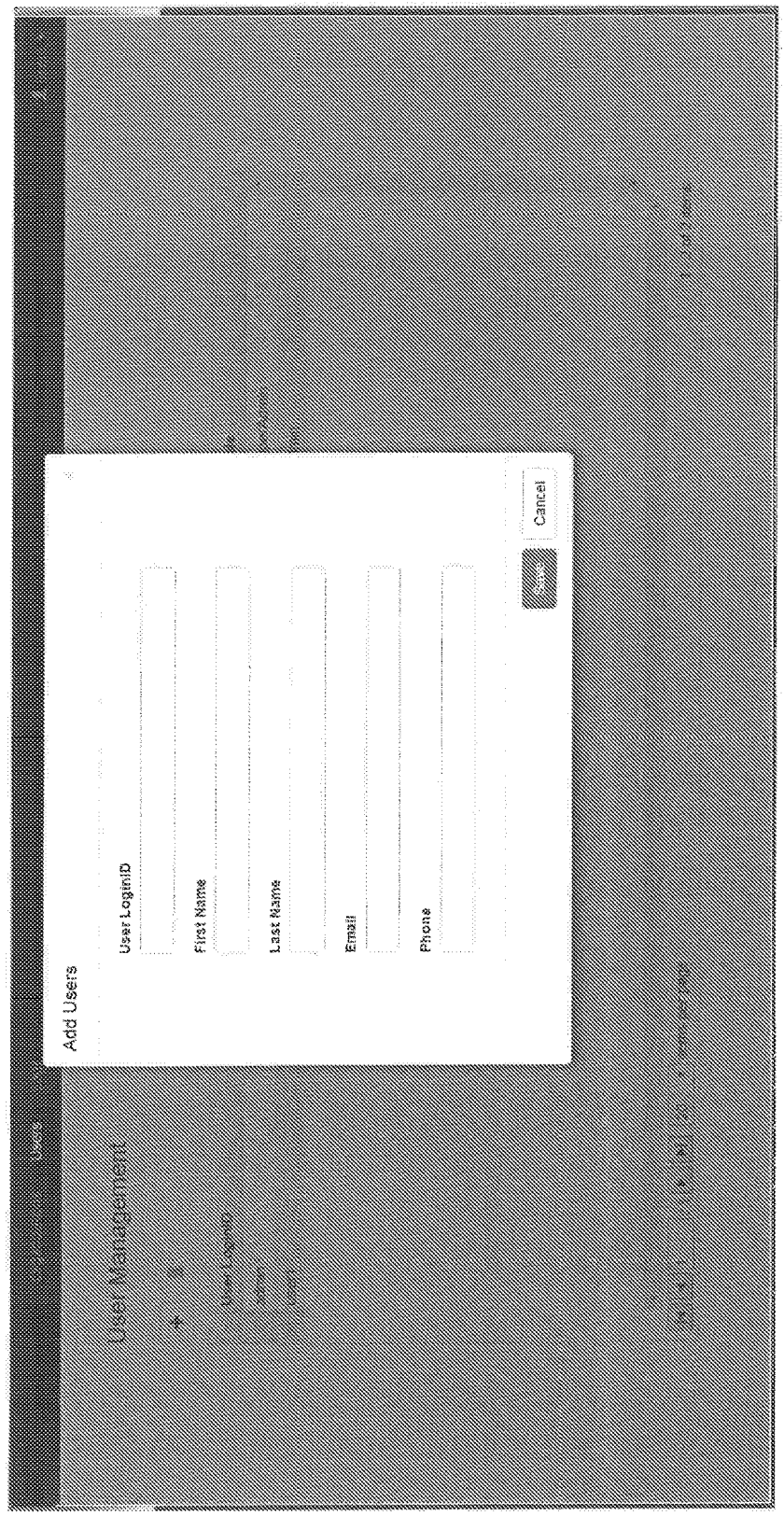
FIG. 3C an example user management screen for adding an administrative user according to an embodiment.
Figure 3D:
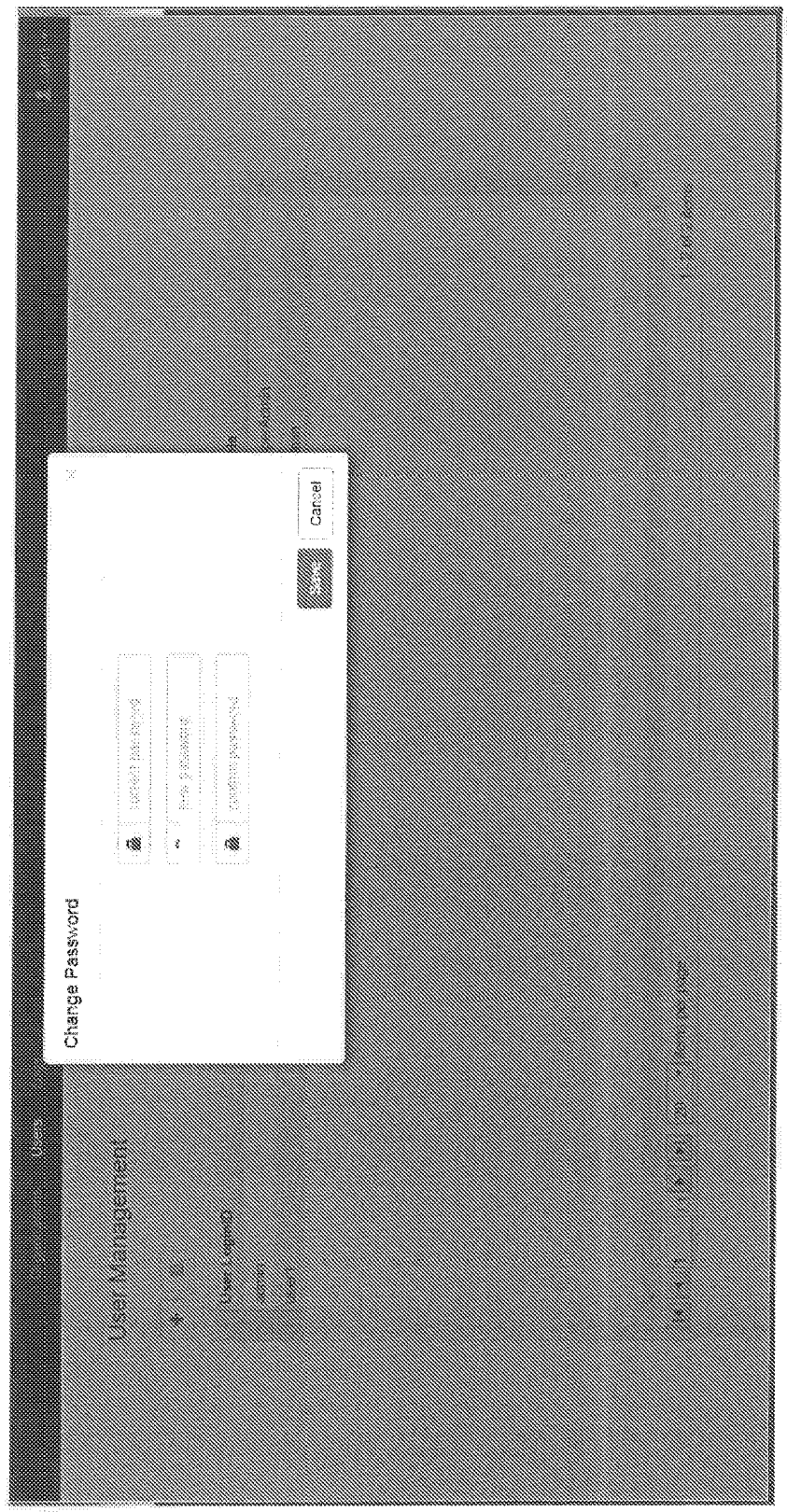
FIG. 3D an example user management screen for changing the password for an existing administrative user by specifying a current password, a new password, and a confirmation of the new password according to an embodiment.
Figure 3E:
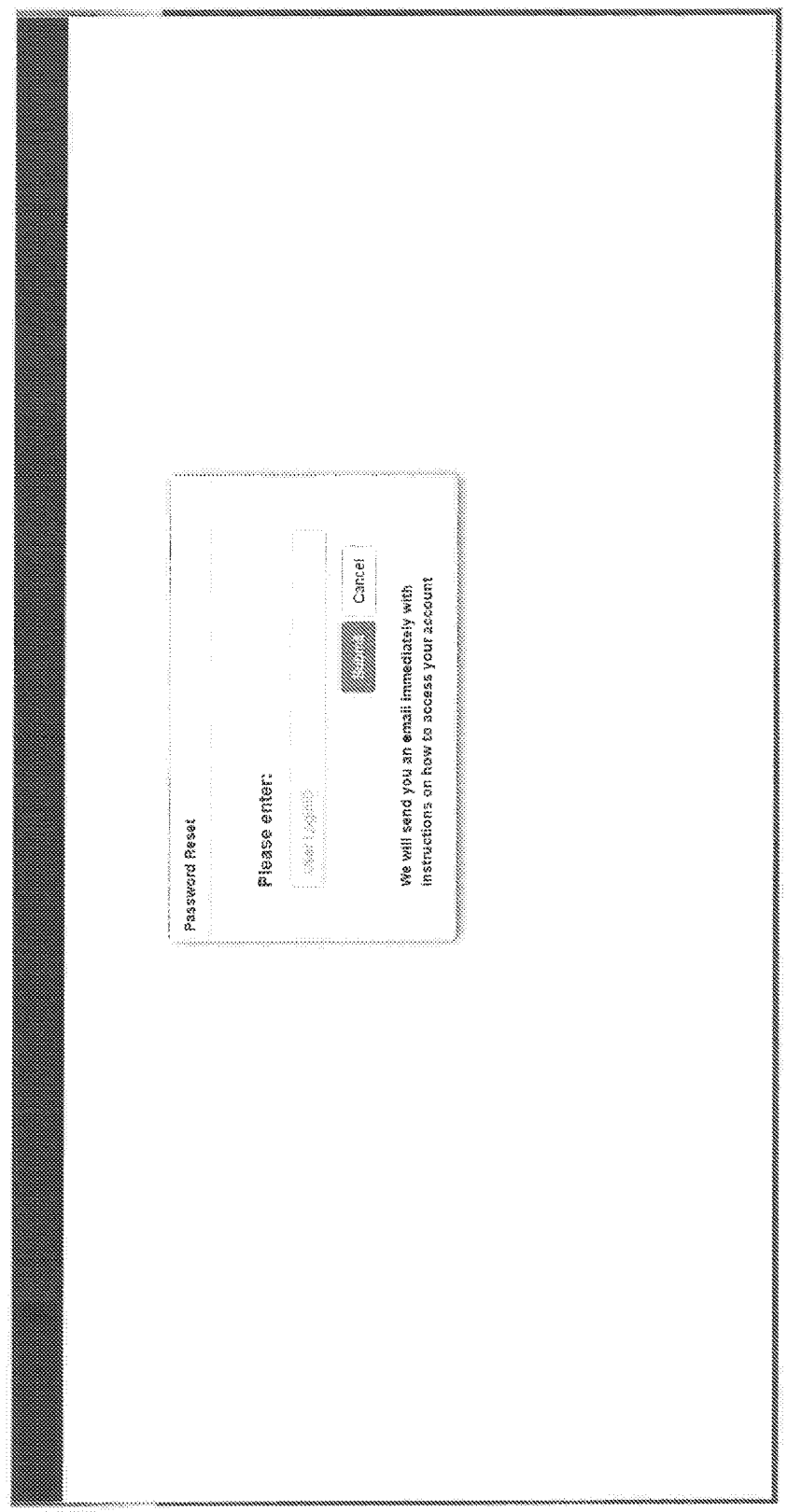
FIG. 3E an example password reset screen that allows an administrative user to request to reset their password according to an embodiment.
Figure 3F:
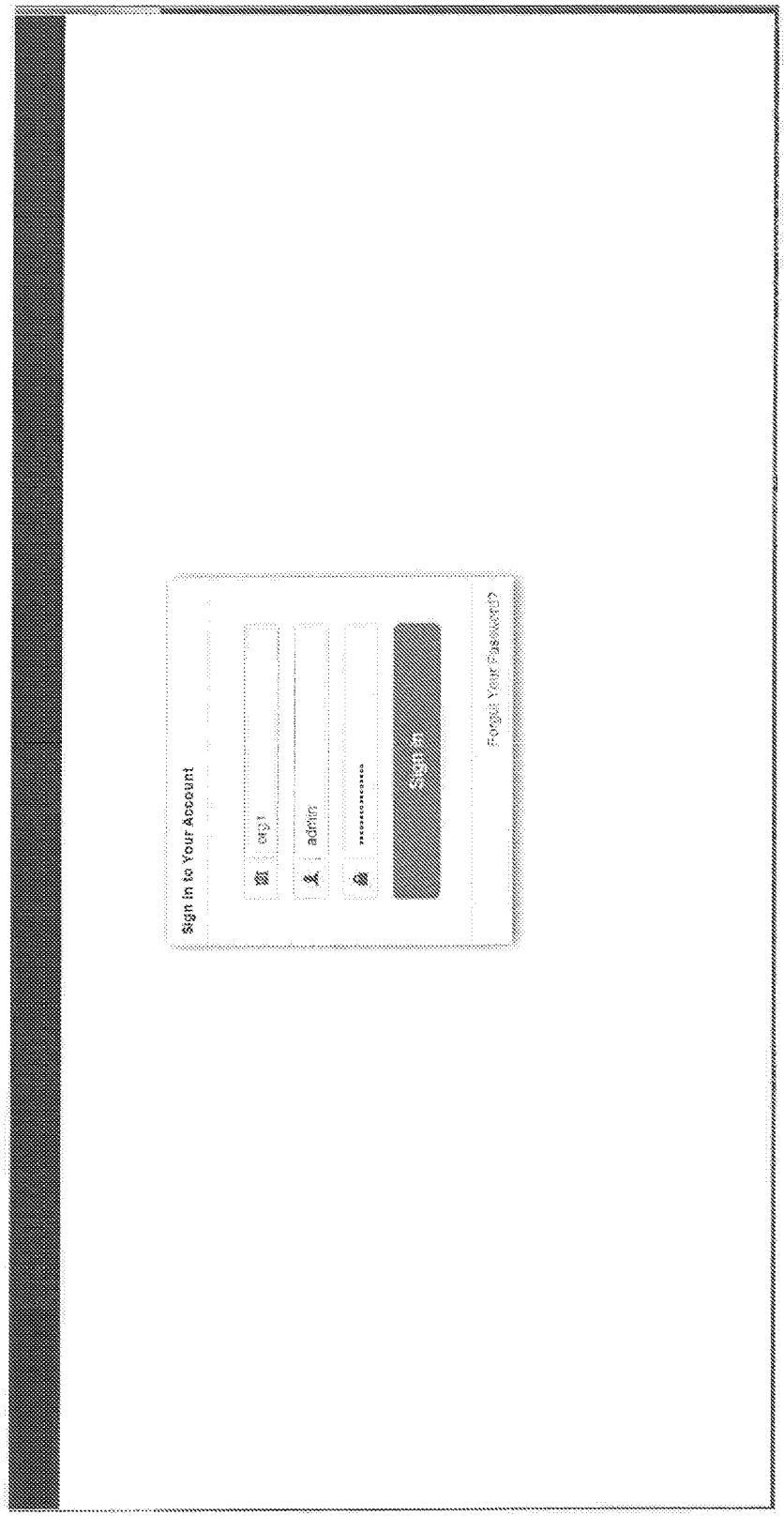
FIG. 3F depicts an example login screen for an administrative user to manage rule users according to an embodiment.
Figure 3G:
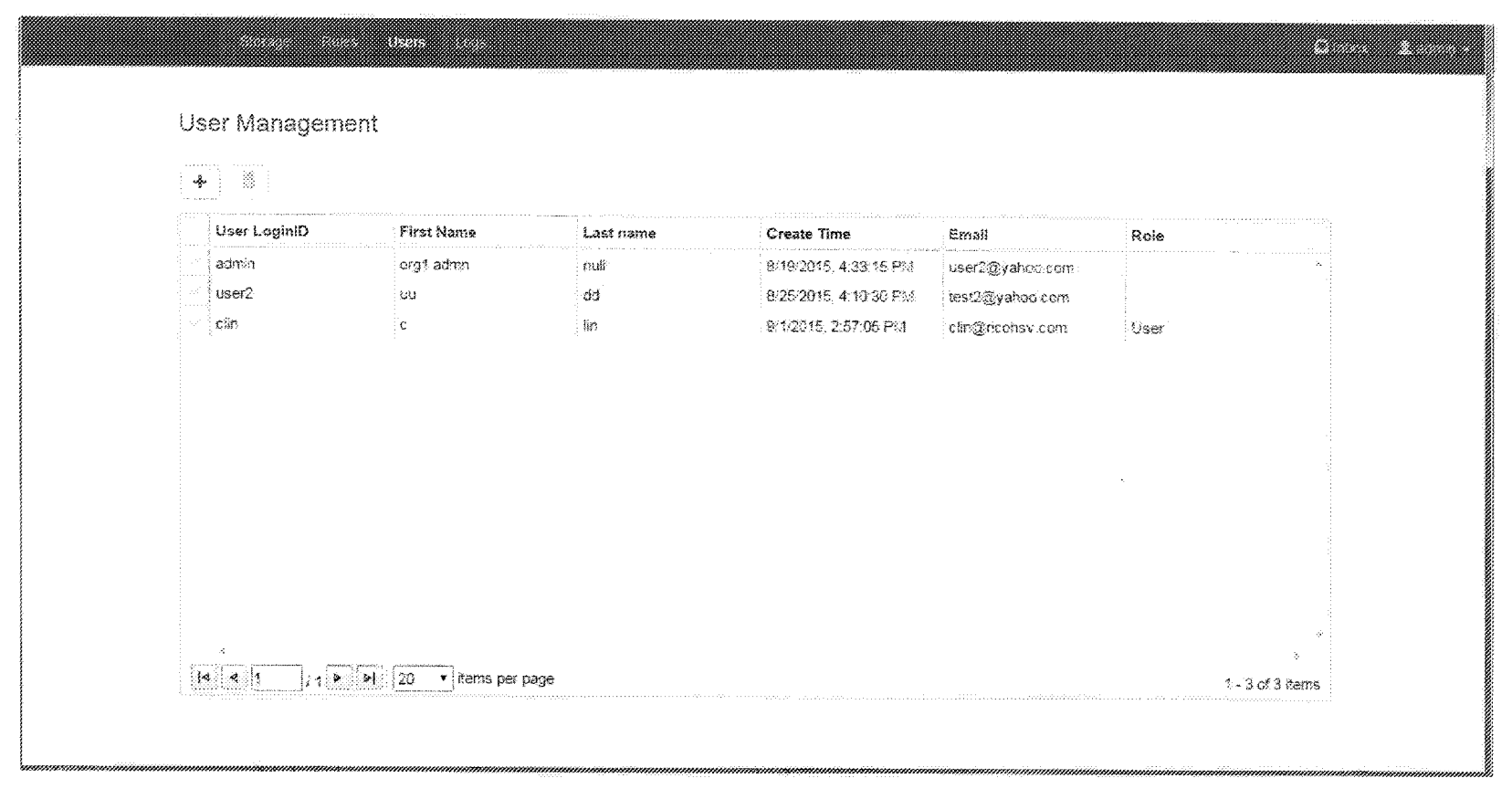
Figure 3H:
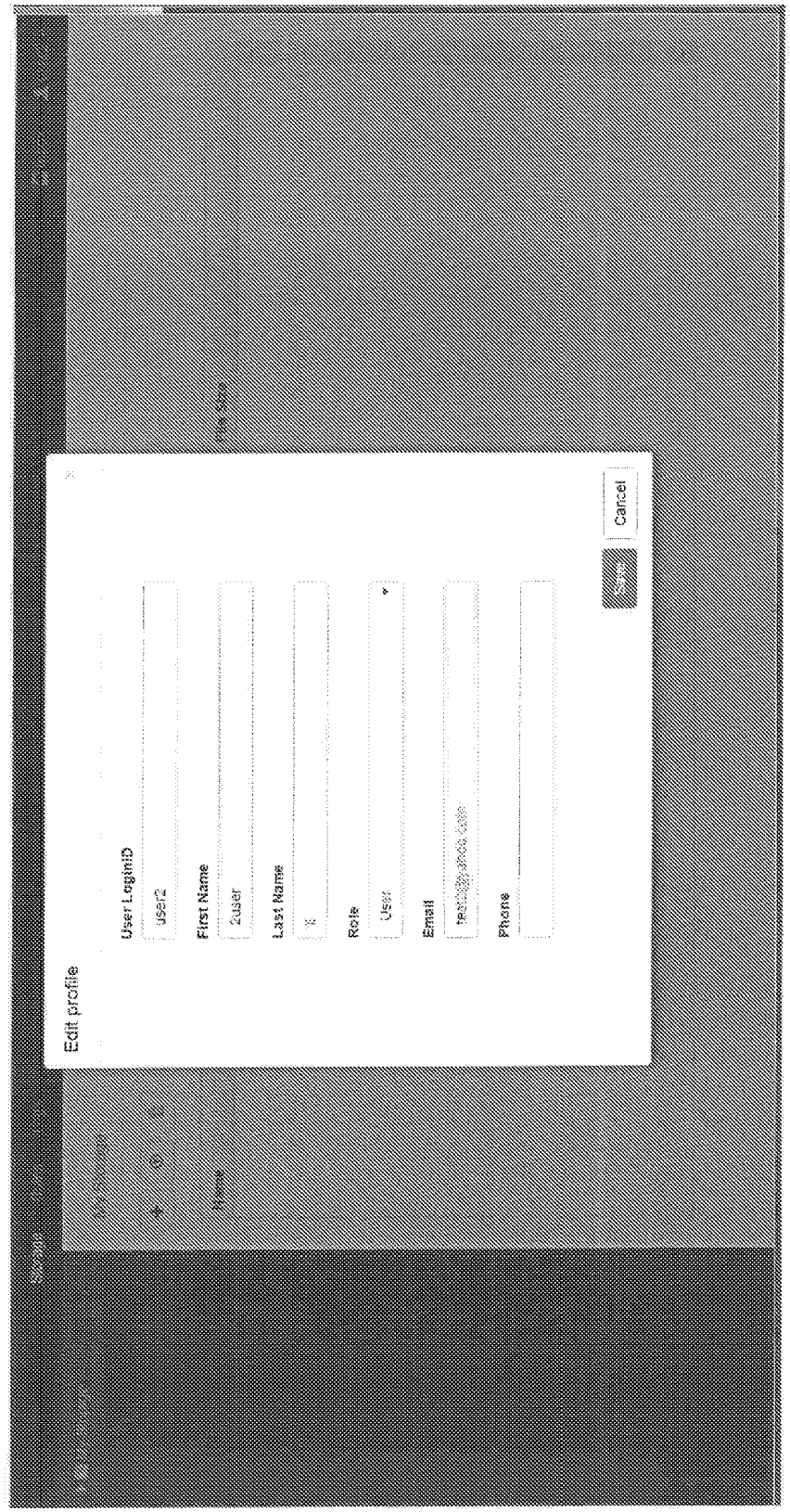
FIG. 3H depicts an example user management screen for editing the profile of a rule user according to an embodiment.

FIG. 3C depicts an example user management screen for adding a user according to an embodiment. In the example depicted in FIG. 3C, the user is queried for a user login ID, first and last name, email address and phone number for the new user. FIG. 3D depicts an example user management screen for changing the password for an existing user by specifying a current password, a new password, and a confirmation of the new password according to an embodiment. FIG. 3E depicts an example password reset screen that allows a user to request to reset their password according to an embodiment. FIG. 3F depicts an example login screen for an administrative user to manage rule users according to an embodiment. Rule users are provided access to rules management 172 functionality provided by SmartFeedback application 150. In this example, the administrative user is queried for user credentials including a username and password. The administrative user is also queried for a logical group, such as an organization, group, project, etc. FIG. 3G depicts an example user management screen that allows an administrative user to manage rule users, including adding, editing, and rule users according to an embodiment. In the example depicted in FIG. 3G, each rule user has an assigned user login ID, first and last name, email address and role, which may be changed by the administrative user. FIG. 3H depicts an example user management screen for editing the profile of a rule user according to an embodiment. In the example depicted in FIG. 3H, the administrative user is able to enter and/or edit a user login ID, first and last name, role, email address and phone number for the rule user.

Figure 3I:
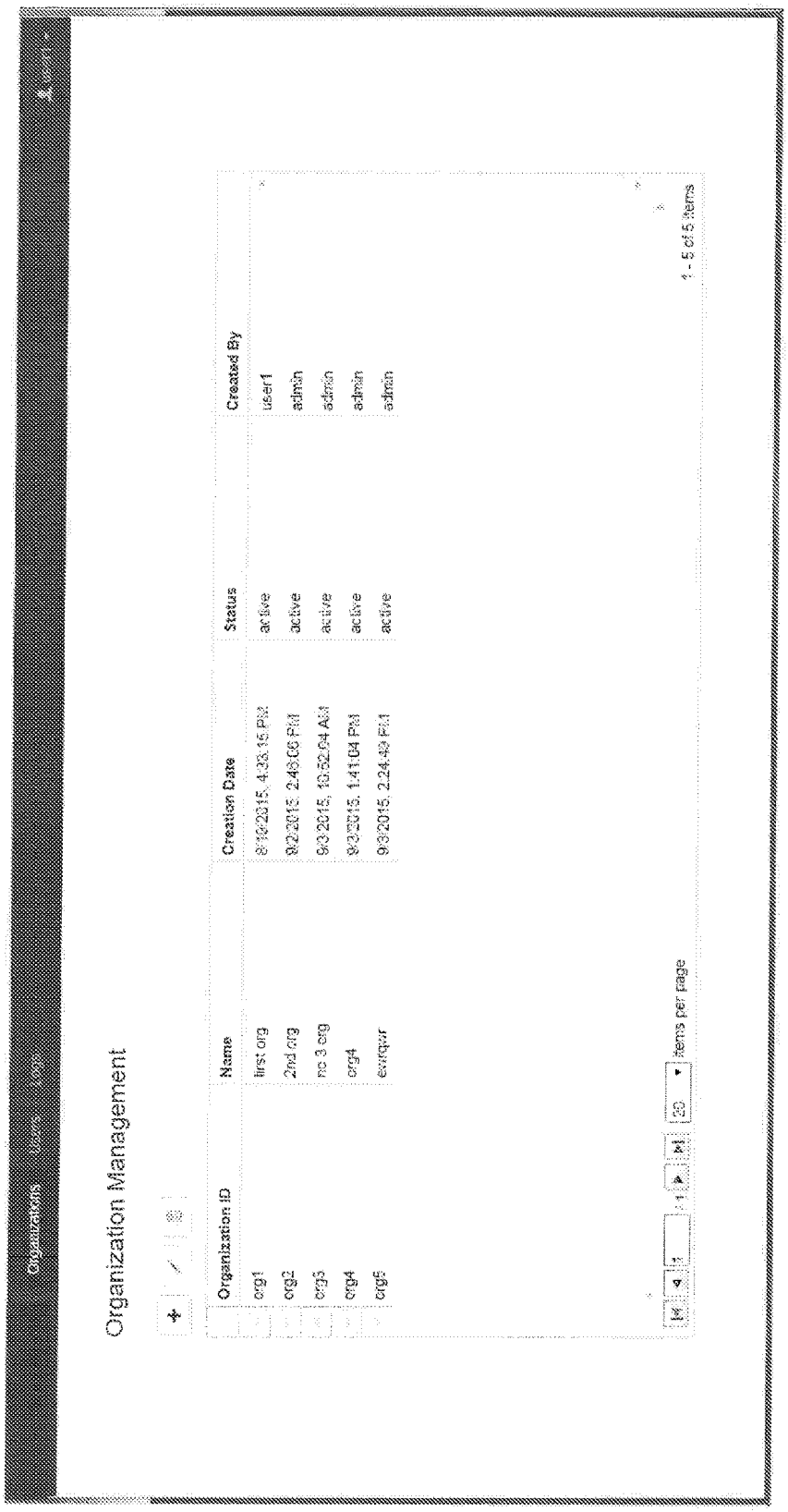
FIG. 3I depicts an example organization management screen for creating, editing and deleting organizations according to an embodiment.
Figure 3J:
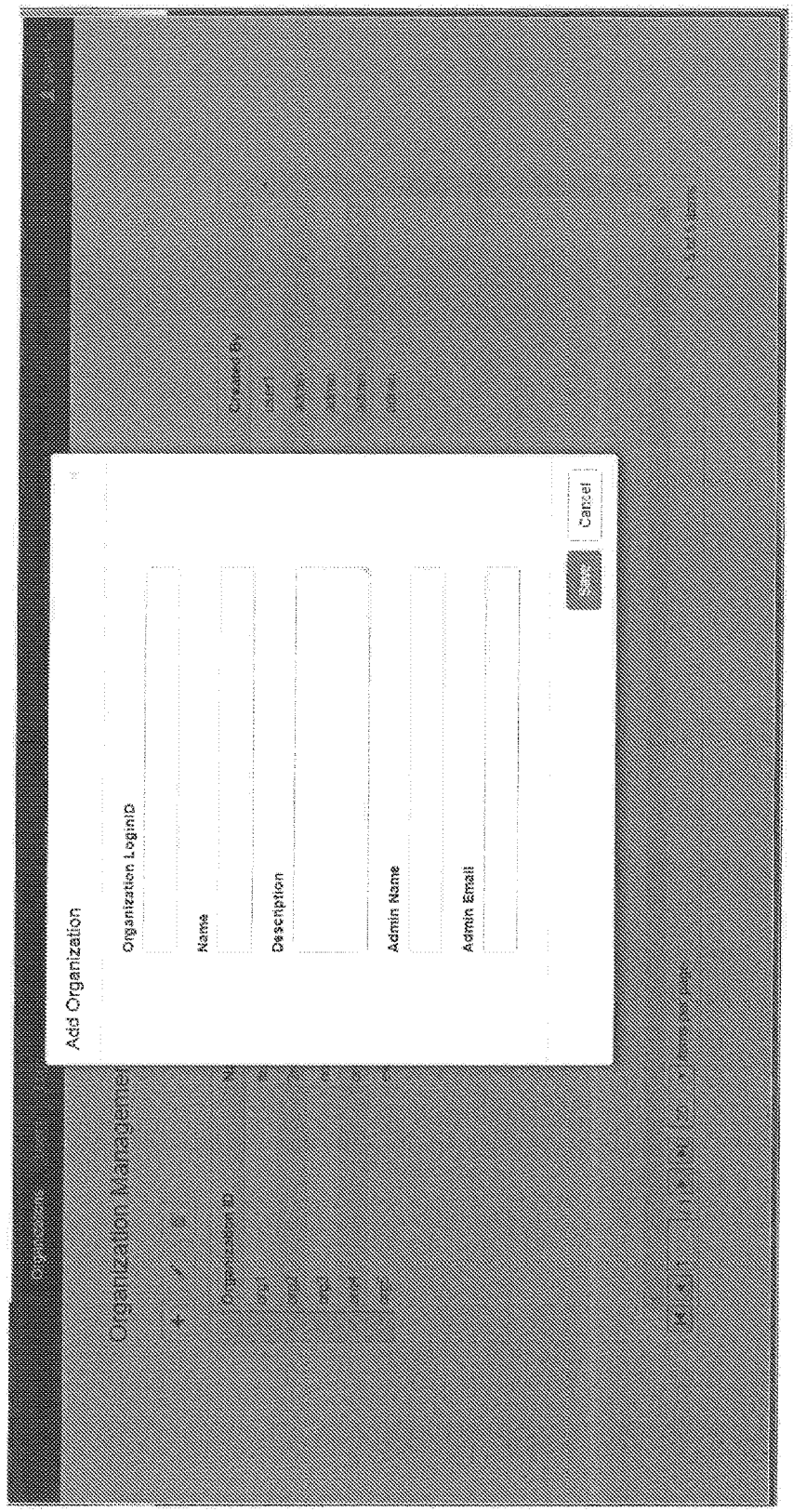
FIG. 3J depicts an example organization management screen for adding a new organization according to an embodiment.

SmartFeedback application 150 supports the management of logical entities, such as organizations, groups, projects, etc. FIG. 3I depicts an example organization management screen for creating, editing and deleting organizations according to an embodiment. In the example depicted in FIG. 3I, each organization that has been created has an organization ID, a name, a creation date, a current status and an identification of the user that created the organization. FIG. 3J depicts an example organization management screen for adding a new organization according to an embodiment. In the example depicted in FIG. 3J, the information specified for a new organization includes an organization login ID, a name, a description, and a name and email address for an administrator for the organization.

IV. STORAGE MANAGEMENT

Figure 3K:
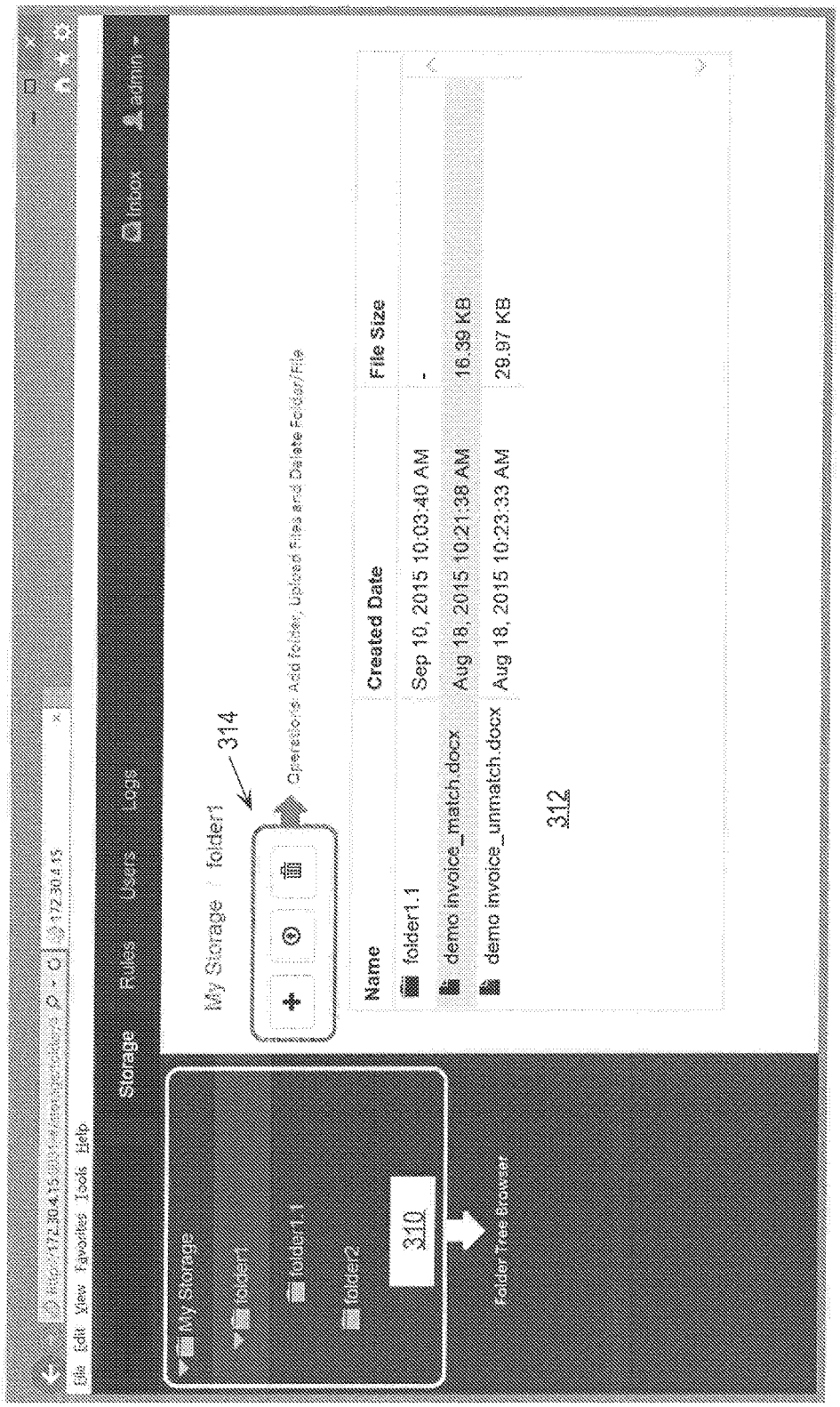
FIG. 3K depicts an example folder operations screen that includes controls that allow a user to browse and view the contents of folders in a folder structure according to an embodiment.
Figure 3L:
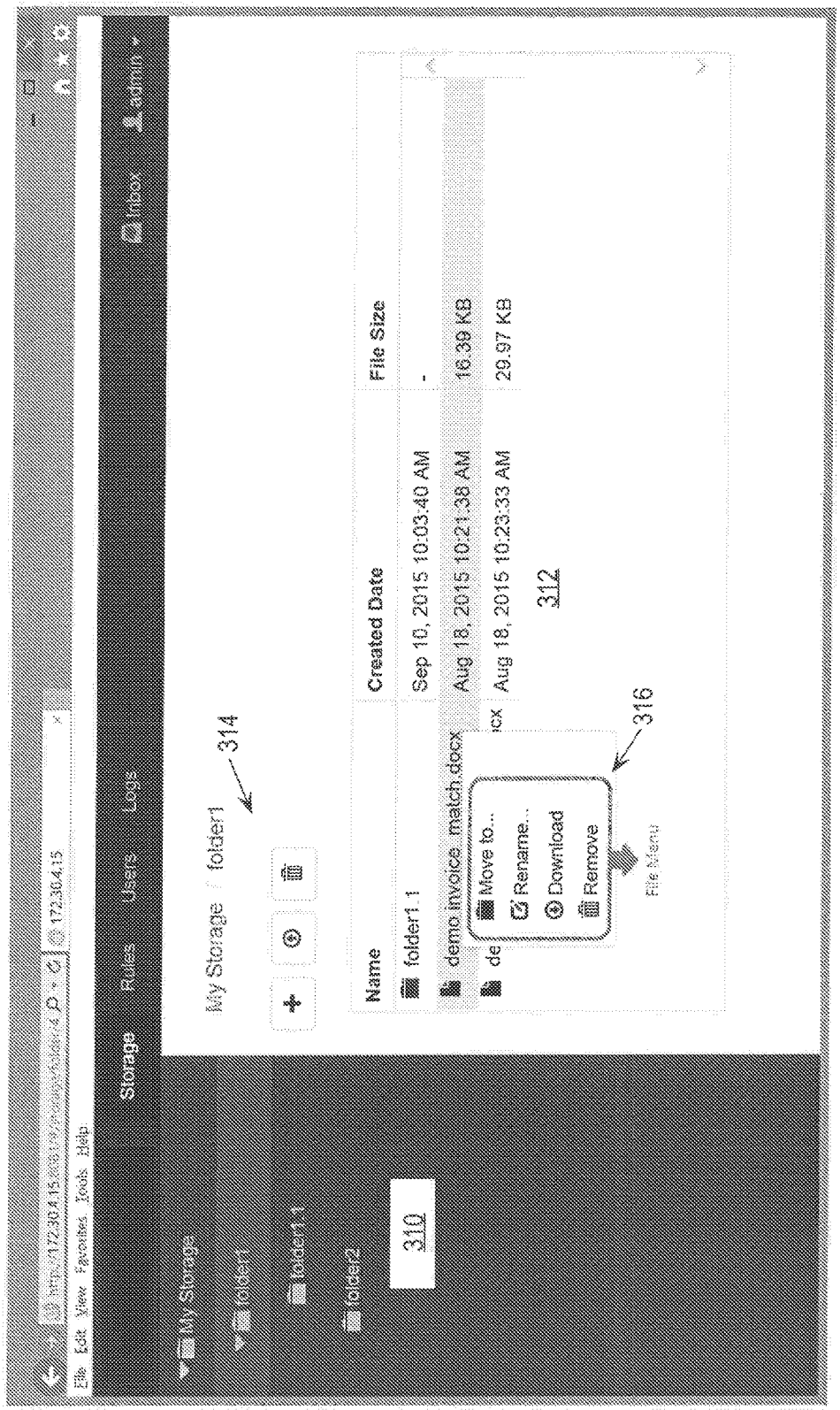
FIG. 3L depicts an example file operations screen that includes controls that allow a user to perform operations on a selected file according to an embodiment.

SmartFeedback application 150 supports various storage management functionality, including adding and deleting logical storage entities, such as folders 142 on storage 140, and performing actions with respect to logical storage entities, such as uploading data to folders 142 and deleting data from folders 142. FIG. 3K depicts an example folder operations screen that includes controls 310 that allow a user to browse and view the contents of folders in a folder structure, such as folders 142, according to an embodiment. In the example depicted in FIG. 3K, the user has used a pointing device, such as a mouse, to select the folder named "folder1" and the contents of this folder are displayed in a table 312. The contents of folder "folder1" include a subfolder named "folder1.1" and two files named "demo invoice_match.docx" and "demo invoice_unmatch.docx." Controls 314 allow the user to perform various operations for folders, including adding a folder, uploading files to the current folder and deleting folders and files. FIG. 3L depicts an example file operations screen that includes controls 316 that allow a user to perform operations on a selected file according to an embodiment. In the example depicted in FIG. 3L, controls 316 allow a user to move, rename, download or remove a selected file.

V. CLASSIFICATION AND RULE MANAGEMENT

Figure 3M:
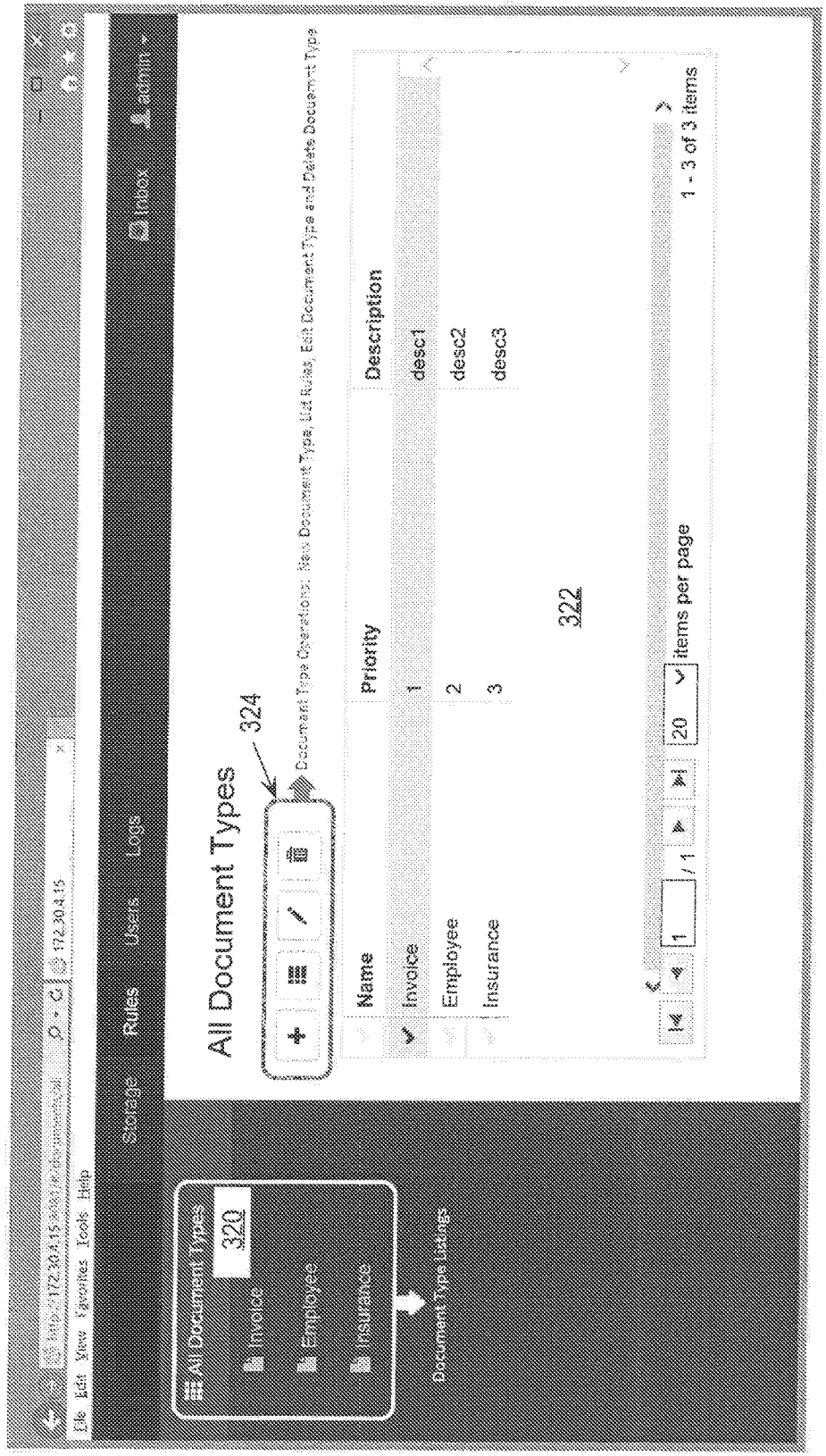
FIG. 3M depicts an example rule management screen that allows a user to manage rules for classifications according to an embodiment.

SmartFeedback application 150 supports various classification and rule management functionality, including providing a user interface for adding, editing and deleting classifications and processing rules for classifications. FIG. 3M depicts an example rule management screen that allows a user to manage rules for classifications according to an embodiment. The rule management screen, and all of the other screens depicted in the figures and described herein, may be provided via user interface data generated by SmartFeedback application 150. One example implementation of user interface data is one or more Web pages. In FIG. 3M, the classifications are in the form of document types, and controls 320 are provided to allow a user to select a particular document type, such as "Invoice," "Employee" or "Insurance." Table 322 displays details for each of the document types, including a priority. The priority is used to determine which classification, i.e., document type, should be given priority when a determination is made that multiple classifications, e.g., document types, apply to a particular electronic data item, such as a particular electronic document. Controls 324 allow a user to add a new document type, list the rules for an existing document type, edit and existing document type and delete an existing document type.

Figure 3N:
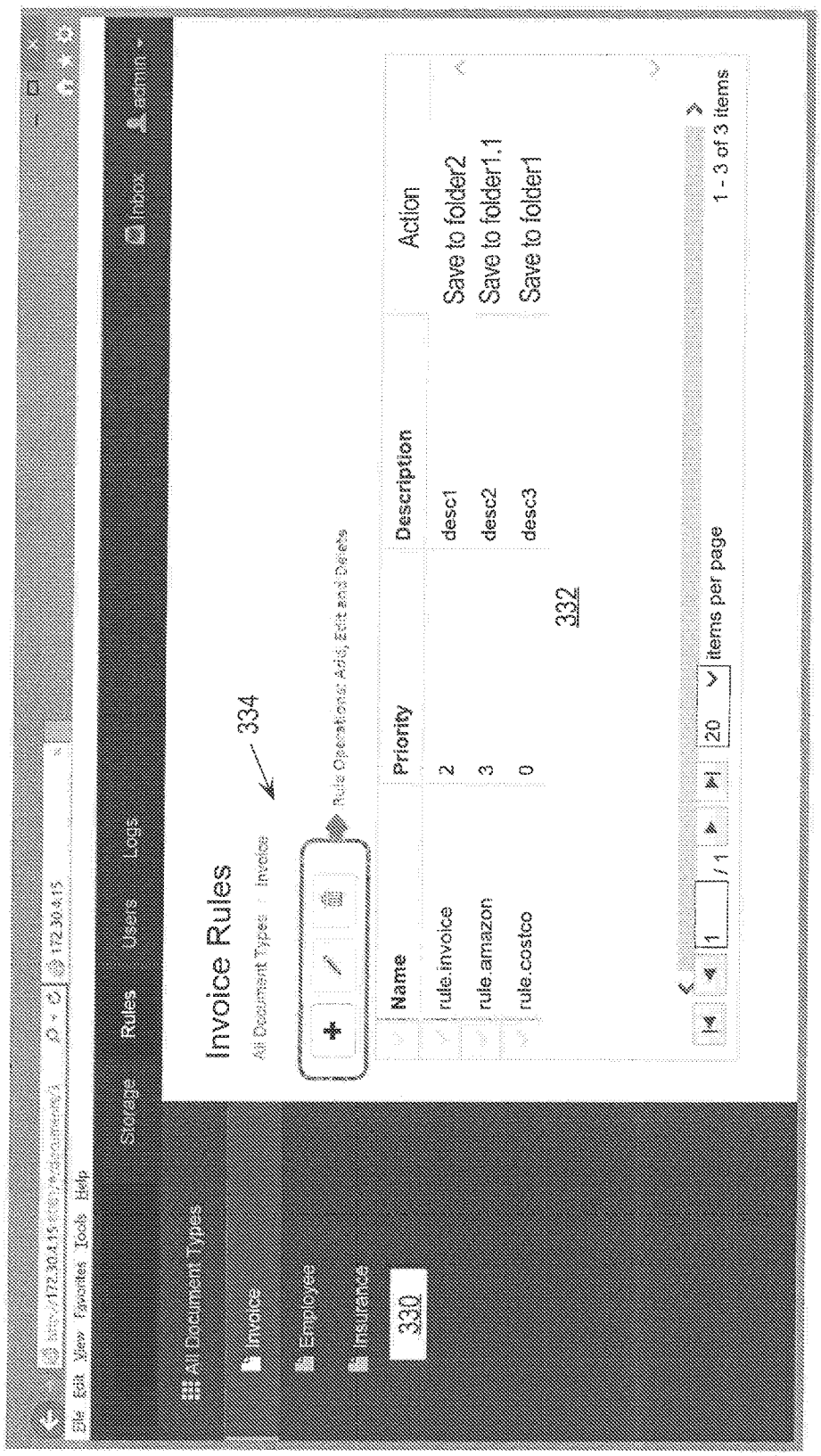
FIG. 3N depicts an example rules operations screen that allows a user to manage rules for a classification according to an embodiment.
Figure 30:
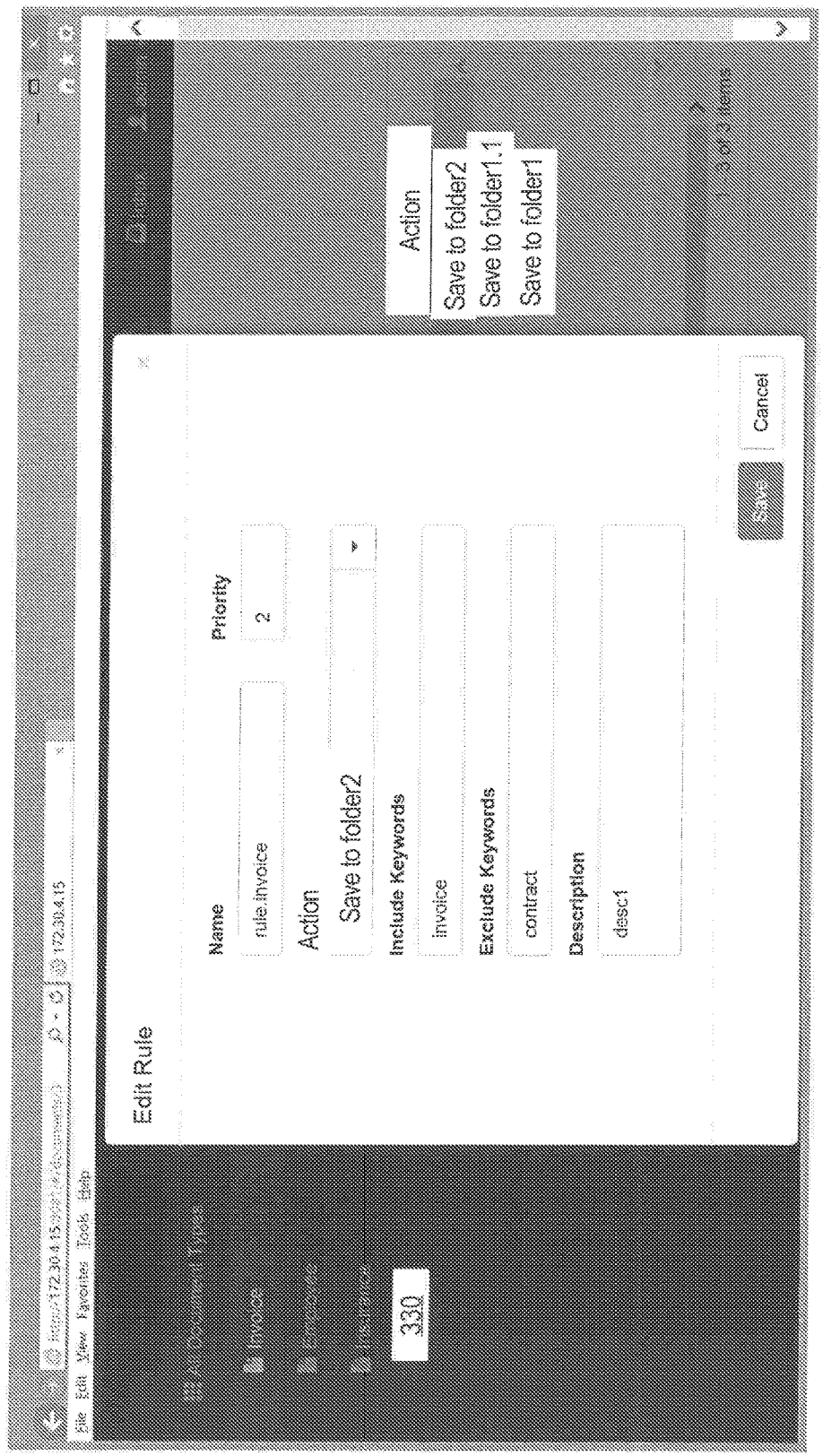

FIG. 3N depicts an example rules operations screen that allows a user to manage rules for a classification according to an embodiment. As in FIG. 3M, in FIG. 3N, the classifications are in the form of document types, and controls 330 are provided to allow a user to select a particular document type, such as "Invoice," "Employee" or "Insurance," and manage the rules for the selected document type. In the example depicted in FIG. 3N, the user has selected the document type "Invoice" and table 332 displays details for each of the three rules assigned to the "Invoice" document type. The details include a rule name, a priority, a description, and action. As described in more detail hereinafter, the priority is used to select a particular rule to be applied when the conditions of more than one rule are satisfied. In the example depicted in FIG. 3N, the actions are all saving the electronic data to a specified folder on storage 140, but other actions may be specified. Actions may be individual actions, or workflows that each include multiple actions. Examples of other actions include, without limitation, sending electronic data to a particular destination or to an application for processing. Controls 334 allow a user to add a new rule, or edit or delete an existing rule.

FIG. 3O depicts an example rule properties screen that allows a user to specify rule properties including a name, priority, action and description according to an embodiment. In the example depicted in FIG. 3O, the rule properties also include conditions under which the rule will apply and not apply, in the form of "Include Keywords" and "Exclude Keywords," respectively. The "Include Keywords" are keywords that need to be included in the electronic data for the rule to apply. In the example depicted in FIG. 3O, if the keyword "invoice" appears in the electronic data, then the rule named "rule.invoice" applies to the electronic data. The "Exclude Keywords" are words that, if present in the electronic data that has been classified, will prevent the rule from applying. In the example depicted in FIG. 3O, if the keyword "contract" appears in the electronic data, then the rule named "rule.invoice" will not apply to the electronic data. The "Exclude Keywords" are optional, but may be useful to provide more granular conditions.

According to one embodiment, the rules property screen depicted in FIG. 3O supports entry of expressions that include multiple keywords and operators, such as Boolean operators. An example expression is "invoice AND customer." The rules property screen may also support the use of pre-specified text-based expressions, or partial expressions, which may be selected by a user to save the user from having to manually formulate expressions. Examples of a pre-specified expression include, without limitation, "invoice AND customer" and "invoice AND." Pre-specified expressions and partial expressions may be accessed via a pull-down menu and may be specified by an administrator. The rules property screen may also provide functionality that enables a user to save expression and partial expressions for future use, for example, in a favorites list. The user may then select from their favorites list when defining rules. Although embodiments are depicted in the figures and described herein in the context of using keywords to specify conditions under which a rule will apply and not apply, embodiments are not limited to these examples and other approaches may be used. For example, any type of code statements or pseudo code may be used to express conditions under which a rule will apply and not apply.

According to one embodiment, SmartFeedback application 150 supports logical group-based classifications and rules. This means that classifications and processing rules may be defined on a per-logical group basis. For example, classifications and processing rules may be defined for an organization, divisions or groups within the organization, departments or sub-groups within the divisions or groups, projects within the departments or sub-groups, teams of users on the projects, individual users, etc. These are just a few examples of logical groups for which classifications and rules may be defined, and embodiments are not limited to any particular logical groups. Furthermore, processing rules may be public or private and organizations may have standard public classifications and processing rules and groups and individuals within the organization may have private classifications and processing rules. For example, a processing rule may be created by an administrative user of an organization that specifies how electronic data classified as "invoice" is to be processed. In this example, the processing rule belongs to the classification "invoice." The processing rule may specify an action of storing the electronic data in a folder on storage 140 that corresponds to the accounting department of the organization. This processing rule may represent a default processing rule for the organization and may be assigned a low priority, e.g., "1" on a scale of 1-10, where a priority of "1" represents the lowest priority and a priority of "10" represents the highest priority. Thus, in the absence of any other processing rules that correspond to the "invoice" classification, electronic data corresponding to the "invoice" classification will be stored in the folder on storage 140 that corresponds to the accounting department of the organization. Another processing rule may be defined for a particular user within the organization. The particular user may be, for example, an employee who works in the accounting department of the organization. Unlike the processing rule defined for the organization, this processing rule specifies, as an action, that the electronic data is to be stored in a folder on storage 140 that corresponds to the particular user. This processing rule may also specify a higher priority than the processing rule for the organization, so that when the electronic data is determined to correspond to the "invoice" classification and the conditions for both rules are satisfied, the processing rule that corresponds to the particular user will be applied instead of the processing rule that corresponds to the organization. This causes the electronic data to be stored in the folder on storage 140 that corresponds to the particular user instead, of the folder that corresponds to the accounting department of the organization. In this manner, the priority attribute for processing rules may be used to determine which processing rule is to be applied when the conditions for multiple processing rules are satisfied. The aforementioned functionality allows hierarchies of classifications and rules to be established for any logical entity. According to one embodiment, when a user logs into SmartFeedback application 150, classifications and/or processing rules created and edited by the user are made with respect to the user. Alternatively, the user may specify a logical group, such as an organization, group, department, team, project, etc., during the login process and then logical groups created and/or edited during the session are associated with the logical group specified during the login process.

VI. INBOX MANAGEMENT

Figure 3P:
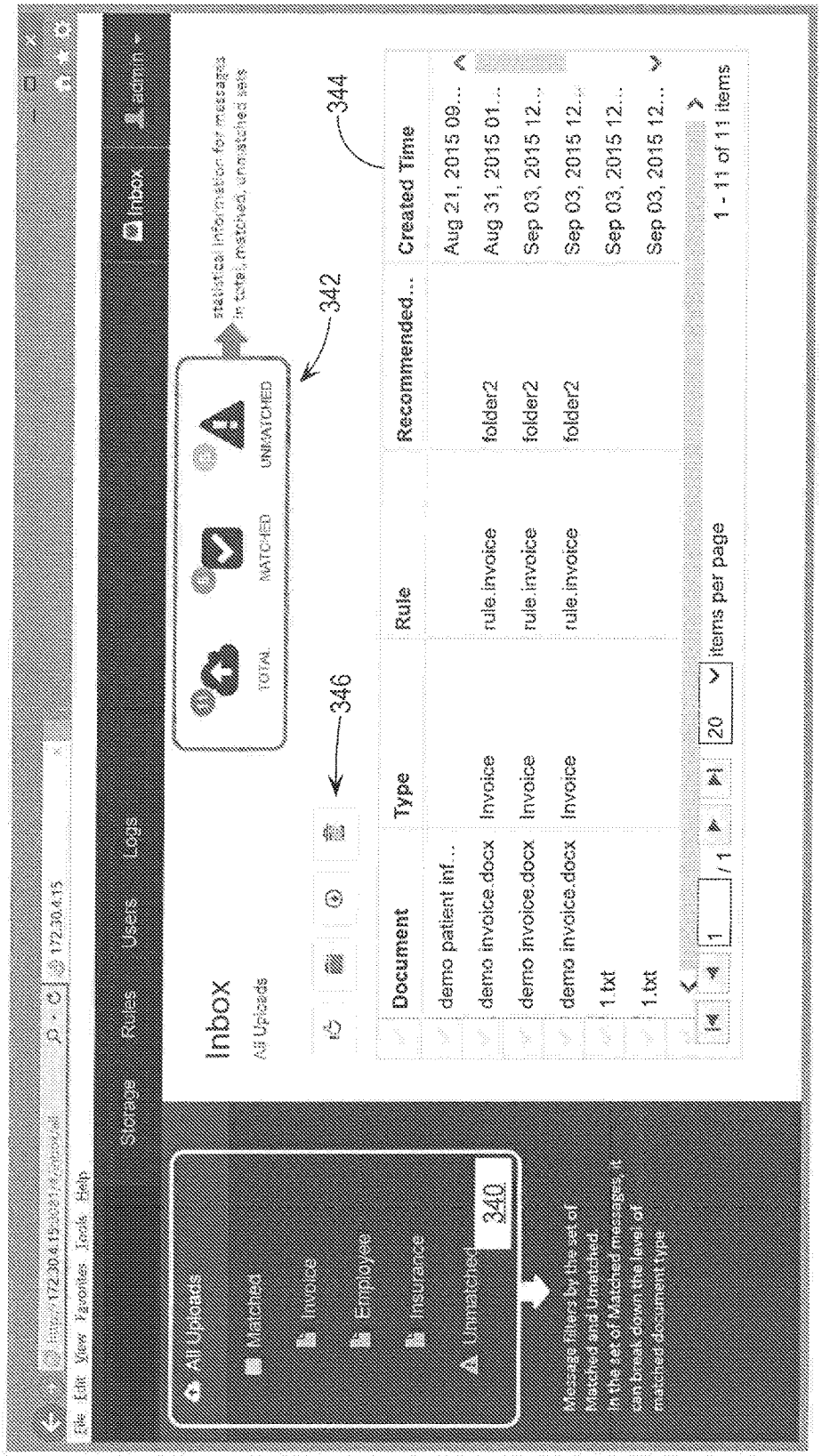
FIG. 3P depicts an example inbox screen according to an embodiment.
Figure 3Q:
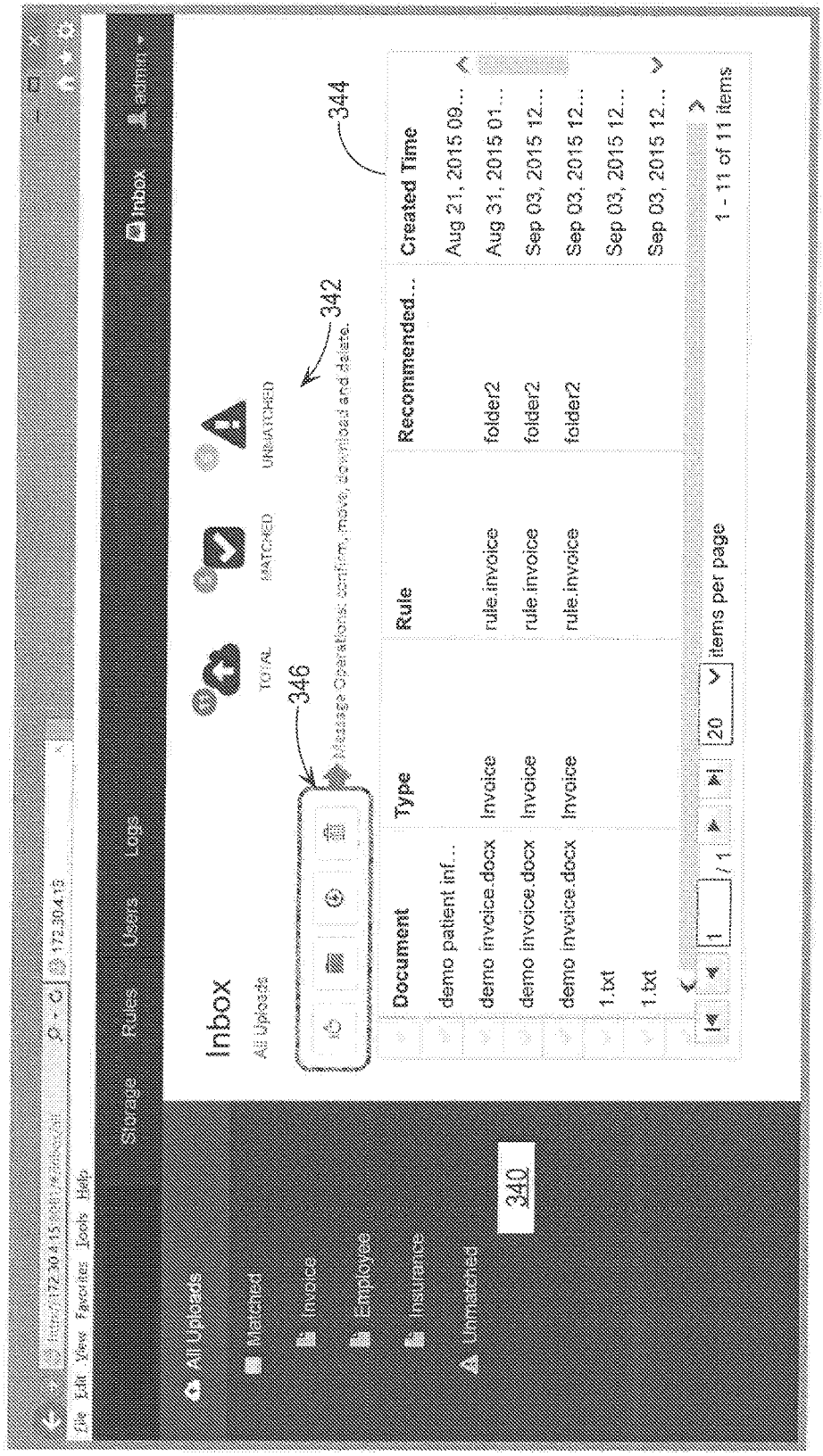
FIG. 3Q depicts controls to allow a user to perform various operations on a selected electronic data item.

SmartFeedback application 150 supports inbox management 170 functionality that allows users to manage the classification and processing of electronic data. FIG. 3P depicts an example inbox screen according to an embodiment. In FIG. 3P, controls 340 are provided to allow a user to select classified, i.e., "Matched," or unclassified, i.e., "Unmatched," electronic data. Electronic data that has been successfully classified is organized by classification, which in the example of FIG. 3P includes "Invoice," "Employee," and "Insurance" classifications. Statistical information 342 is provided that indicates the total number of electronic data items, the number of electronic data items that have been "matched," i.e., classified, and the number of electronic data items that are "unmatched," i.e., not classified. In the example depicted in FIG. 3P, there are 11 total electronic data items, of which five have been classified and six have not been classified. A table 344, shows details for the electronic data items selected via controls 340, which in the present example includes all 11 electronic data items. The details include a name of an electronic data item, in the form of a document, a classification, in the form of a type, for those electronic data items that have been classified, a rule that applies to the classification, an action specified by the rule in the form of a Recommended destination folder, and a creation time. As depicted in FIG. 3Q, controls 346 are provided to allow a user to perform various operations on a selected electronic data item, including performing message operations, confirming a determined classification, moving an electronic data item to a different folder and deleting an electronic data item.

VII. SMART FEEDBACK

In an embodiment, SmartFeedback application 132 is an application implemented on mobile device 130 and configured to display classification data for electronic data items that are waiting to be processed according to the rules for the classification. In addition to displaying the classification data, SmartFeedback application 132 is configured to send user selection data back to the SmartFeedback application 150. User selection data includes user confirmations and/or user requests. A user confirmation is defined as input from the user that confirms the classification assigned to a particular electronic data item. User requests are user input that specify either a manual change to the assigned classification, the action specified by the corresponding rule, or the deletion of the electronic data item and its classification designation. In an embodiment, user requests include, but are not limited to, user change requests, user delete requests, and user train requests.

In an embodiment, SmartFeedback application 132 is configured to generate, and cause to be displayed on mobile device 130, multiple user interface screens that allow a user to login to the SmartFeedback application 132, navigate to different pending electronic data items, and send user selection data related to assigned classifications for the pending electronic data items. Embodiments are described hereinafter in the context of electronic data items being electronic documents, or documents for short, but embodiments are not limited to this context and are applicable to any type of electronic data items.

FIG. 4A depicts a home screen for mobile device 130 including the smart feedback icon 402 that represents SmartFeedback application 132 according to an embodiment. In an embodiment, notification bubble 404 represents a visual notification that shows pending documents for classification. Notification bubble 404 may be implemented using multiple notification methods for notifying the user of pending documents, including, but not limited to, different colored notification bubbles, notifications on mobile device 130 lock screen, pop-up notifications on mobile device 130 notification pane, audible beeps or other audible notifications, and notifications in the form of vibrations from mobile device 130.

In an embodiment, SmartFeedback application 132 may implement multiple types of notification methods based upon different priority levels associated with classifications in the classification data. For example, SmartFeedback application 132 may implement notification methods for high priority classifications that include notifications on the client device lock screen, audible beeps, and/or vibrations from mobile device 130 to alert the user of pending documents with high priority classifications.

FIG. 4B depicts a sample user login screen for SmartFeedback application 132 according to an embodiment. Login controls 406 allows a user to specify an organization and enter user credentials, such as a username and password, for login purposes. In an embodiment, classification data for particular classified documents are associated with particular users. For instance, User A may only have privileges related to legal documents. After User A logs into SmartFeedback application 132, User A only sees classification data for pending legal documents that User A has authority to confirm, change, or delete assigned classification.

In an embodiment, multiple users may be associated with logical groups so that multiple users would receive the same notifications for a certain set of documents. For example, User A and User B may be part of "Legal Group 1" and either User A or User B would have the ability to confirm, change, or delete assigned classifications related to the specific legal documents. Although embodiments are described herein in the context of particular types of groups, this is done for explanation purposes only, and embodiments are applicable to any type of logical group.

Figure 4C:
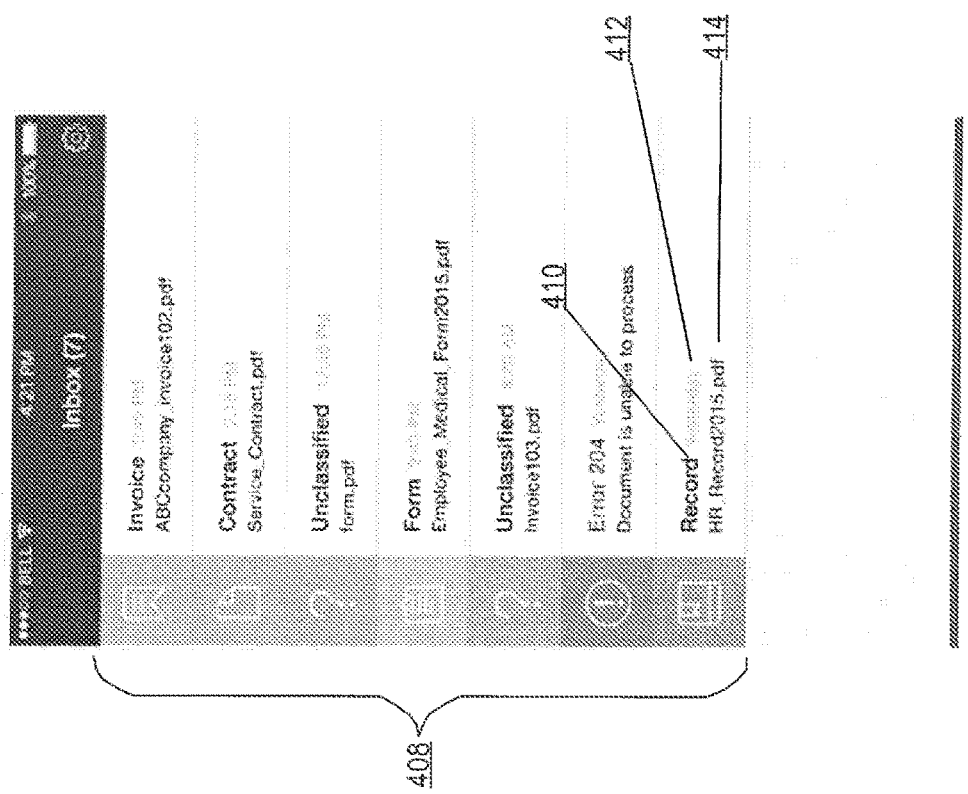
FIG. 4C depicts an example pending documents display screen according to an embodiment.

In an embodiment, pending documents may be displayed in a list format that includes the determined classification type, document name and/or document identifier, and a time stamp of when the classification type for the document was determined. FIG. 4C depicts an example pending documents display screen according to an embodiment. In an embodiment, list 408 depicts the list of pending documents that require classification confirmation or other actions. List 408 may be implemented to use icons that represent different classifications. For example, classification type Invoice may be represented with a blue colored box with a bookmark icon. Other classifications, such as Form, may be represented with a yellow colored box with a clipboard icon. By using different configured icons and different colors the user is able to quickly recognize the classification type assigned by classification 160. Other embodiments of list 408 may differentiate classifications by using different colored boxes, different icons, or colored shading of the entire row.

List 408 may be configured to display specific document details for each pending document. FIG. 4C shows classification name 410 displayed next to the classification type icon in list 408. Classification name 410 may be a user configured display name for each classification type, which also includes name for unclassified designations and error designations. Additionally timestamp 412 may be displayed for each pending document within list 408. In an embodiment, timestamp 412 may indicate the time at which the classification was determined. In another embodiment, timestamp 412 may indicate the time and date at which the document was scanned by the data source 110. In yet another embodiment, timestamp 412 may indicate the date and time at which an OCR process performed OCR text recognition.

In an embodiment, document ID 414 may display the document file name or document identifier for the pending document. The document ID 414 may be derived from OCR data from the document or any other configured parameter used to identify the file. For example, document ID 414 references document file name "HR_Record2015.pdf". In an embodiment, the user of SmartFeedback application 132 may configure display options of list 408 to either display more or less document and classification details as described.

In an alternative embodiment, list 408 may be comprised of items that represent different classifications. For example, list 408 may list the different classifications for the pending documents. Then when the user clicks on a specific classification type, SmartFeedback application 132 displays another list of all pending documents of that particular classification type.

In an embodiment, when the user clicks on one of the pending documents in list 408, SmartFeedback application 132 displays a document details screen. FIG. 4D depicts an example document details screen according to an embodiment. The document details screen displays details of the pending document including, but not limited to, the document ID 414, the timestamp 412, the classification name 410, a classification icon 416, a destination folder 418, and available user options. The document details screen may be configured with available user options including, but not limited to, confirm, change, and delete.

A. User Confirmation

In an embodiment, the confirm button 420 allows the user to confirm the assigned classification type for the particular document. When the user selects the confirm button 420, SmartFeedback application 132 sends user selection data that contains the user confirmation to SmartFeedback application 150. Contents of the user selection data may include details such as, an acknowledgement that confirms the classification type of the particular document, document identification data, and the classification type being confirmed. In another embodiment, user selection data may additionally include information about the user who confirmed the classification type. By sending user information within the user selection data, the SmartFeedback application 150 may be capable of keeping a log of which users confirmed which documents. In yet another embodiment, user selection data may be limited to only including an acknowledgement and the document ID for the purposes of limiting the size of user selection data.

In an embodiment, SmartFeedback application 132 may notify the user that the user selection data, including the user confirmation, has been sent to SmartFeedback application 150. FIG. 4E depicts an embodiment of SmartFeedback application 132 notifying the user that the user confirmation has been sent to SmartFeedback application 150 and the particular document has been moved to the appropriate destination folder. In an embodiment, a sent notification 426 window may be displayed on the user screen to notify the user that the user selection data has been sent to SmartFeedback application 150.

In an embodiment, user confirmation may include confirming a particular classification type of a document as well as specifying a particular destination folder for the document. If the particular classification type is a top level classification that has related sub-classifications or multiple actions, such as saving to multiple destination folders, then SmartFeedback application 132 may display a subset of destination folders from which the user may select where to route the document. For example, classification type Invoice may have multiple destination folders related to it, such as, Project_A, Project_B, Project_C, and Project_D. In this scenario, when the user selects the confirm button 420, SmartFeedback application 132 may prompt the user to choose one of the destination folders from the subset of destination folders Project_A through Project_D. Once the user selects a destination folder from the subset of destination folders, SmartFeedback application 132 sends the user selection data that contains the user confirmation, including the selected destination, folder to SmartFeedback application 150.

In an embodiment, after SmartFeedback application 132 has sent the user selection data to SmartFeedback application 150, SmartFeedback application 132 may display the pending documents display screen (FIG. 4C) so that the user may confirm, change, or delete a classification type for a second document in list 408. Steps for confirming a second document may include the same display screens and same options as confirming the previous document.

B. User Change Request

Referring back to the document details screen, as depicted in FIG. 4D, the user has the option of changing the classification and destination folder of a document that has been currently assigned to a particular classification type by SmartFeedback application 150. In an embodiment, the change button 422 allows the user to change the classification type and the destination folder for the document. When the user selects the change button 422, SmartFeedback application 132 presents the user with available classifications to be assigned to the document. In an embodiment when the user selects the change button 422, SmartFeedback application 132 may request, from SmartFeedback application 150, a set of available classifications that may be assigned to the document. In an alternative embodiment, SmartFeedback application 132 may have already received the set of available classifications as part of the classification data previously provided by SmartFeedback application 150.

Figure 4F:
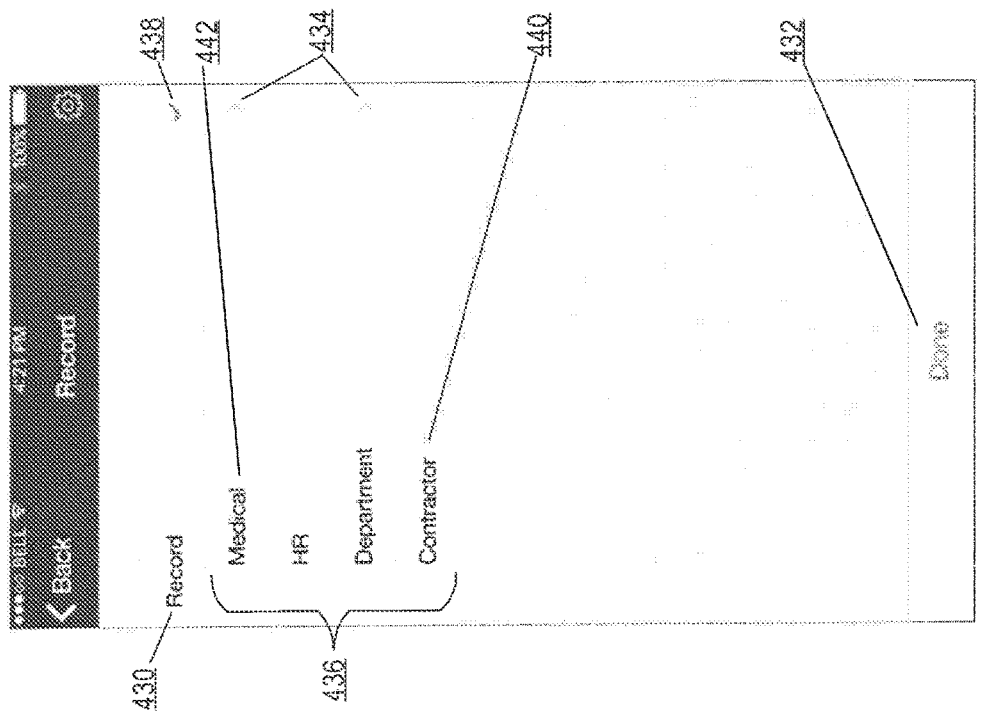
FIG. 4F depicts an example screenshot of the set of available classifications displayed after the user selects the change button according to an embodiment.

FIG. 4F illustrates an example screenshot of the set of available classifications displayed after the user selects the change button 422 according to an embodiment. The set of classifications may be presented to the user in the form of a hierarchal set of classifications. For instance, top level classifications 428 depicts the top level of classifications available. These classifications are the broadest classifications and may contain related sub-classifications. Available sub-classifications may be indicated by a sub-classification arrow 434.

Figure 4G:
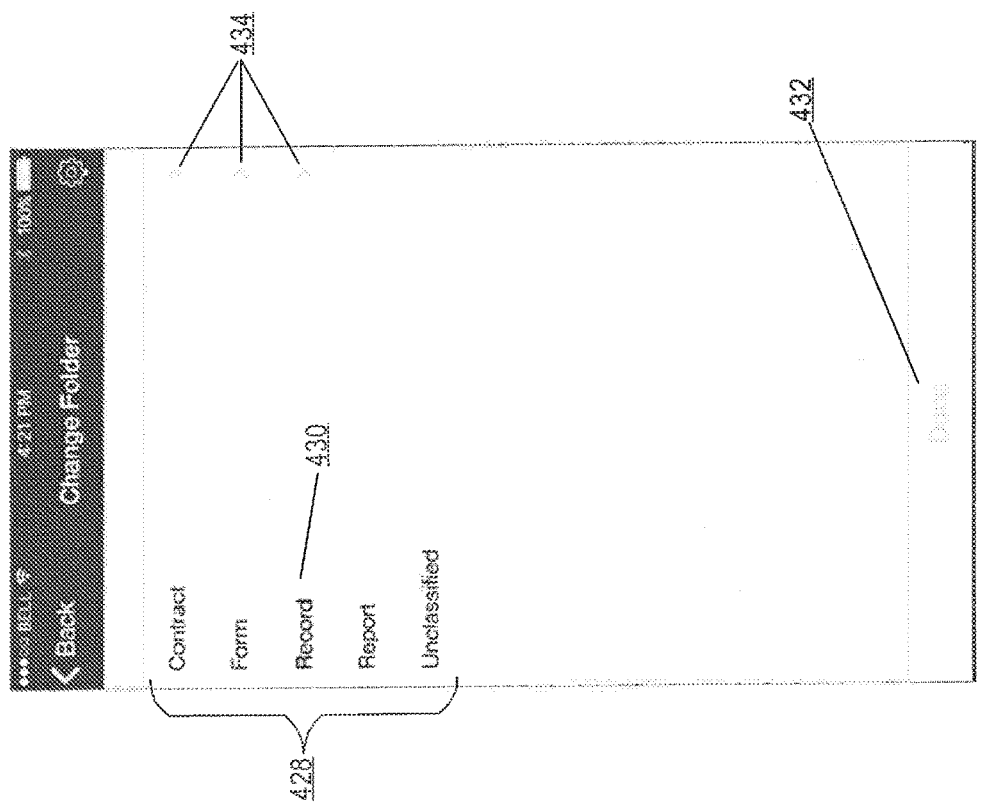
FIG. 4G depicts an additional sub-classification screen for classification type record according to an embodiment.

In an embodiment, when the user selects a classification type that has the sub-classification arrow 434, the user may be presented with an additional sub-classification screen where the user may either select a sub-classification or choose to assign the previously selected classification type. For example, if the user selected classification type record 430, which has an associated sub-classification arrow 434, then the user would be presented with an additional sub-classification screen. FIG. 4G depicts an additional sub-classification screen for classification type record 430 according to an embodiment. In FIG. 4G, classification type record 430 has been selected by the user, as shown by the selection arrow 438. Since classification type record 430 has been selected, the user may elect to assign that particular classification type to the document pressing the done button 432 at the bottom of the screen. When the user selects the done button 432, SmartFeedback application 132 sends user selection data, which contains the user change request, to SmartFeedback application 150. Contents of the user change request may include the document ID 414, the newly selected classification type record 430, and optionally information identifying the user that is making the change request. In response, to receiving the user change request, SmartFeedback application 150 may be configured to route the document to the destination associated with the newly selected classification type.

In another embodiment, the user may optionally continue to select classifications that have related sub-classifications. For example referring to FIG. 4G, the user may continue to traverse down the classification type hierarchy by selecting one of the sub-classifications of classification type record 430, labelled as record sub-classifications 436. If the user selects sub-classification contractor 440, which does not have an associated sub-classification arrow 434, then the user may trigger a user change request by pressing the done button 432 at the bottom of the screen. Alternatively, if the user selects sub-classification medical 442, which does have an associated sub-classification arrow 434, then SmartFeedback application 132 may further present the user with another set of sub-classifications, as illustrated in FIG. 4H.

FIG. 4H depicts an example set of sub-classifications for sub-classification medical 442, labelled as medical sub-classifications 444 according to an embodiment. Since the sub-classifications within medical sub-classifications 444 do not have any associated sub-classification arrows, once the user selects a sub-classification from the medical sub-classifications 444, the user may trigger a user change request by pressing the done button 432. For example, if the user selected sub-classification Dr. Davis 446, then SmartFeedback application 132 would indicate the selection using selection arrow 438. The user then would trigger the user change request by pressing the done button 432. In this example, the user change request would include document ID 414 and the newly selected classification type Dr. Davis 446. In an embodiment, the user change request may additionally include the destination folder for Dr. Davis 446.

In another embodiment, in response to selecting the change button 422 on the document details screen (FIG. 4D), SmartFeedback application 132 may present the user with a set of available destination folders.

Referring to FIG. 4F, the user may select a special classification type labelled "Unclassified" from the top level classifications 428 list. In an embodiment, upon selecting the "Unclassified" label, SmartFeedback application 132 may send an unclassified options request to SmartFeedback application 150. In an embodiment, SmartFeedback application 150, in response to receiving an unclassified options request, may transmit classification data to SmartFeedback application 132 that labels the document as unclassified, which may prompt SmartFeedback application 132 to provide classification options for the newly unclassified document.

C. User Delete Request

Referring back to the document details screen, as depicted in FIG. 4D, the user has the option of removing the pending document by pressing the delete button 424. In an embodiment, the delete button 424 causes SmartFeedback application 132 to send a deletion request to SmartFeedback application 150. The deletion request may delete the pending document and its assigned classification from the pending documents. By deleting a pending document, the document, including all OCR data, is deleted from storage 140.

In another embodiment, the delete button 424 may be configured to only delete the classification type assigned to the pending document. In this scenario, SmartFeedback application 132 may send a user delete request to SmartFeedback application 150 that only includes a request to remove the assigned classification type. This may result in SmartFeedback application 150 assigning the unclassified label to the pending document.

D. User Training Request

In an embodiment, when SmartFeedback application 150 is unable to determine a classification type for a document, SmartFeedback application 150 may assign a special classification type called "unclassified" to the document. The unclassified type may be assigned when SmartFeedback application 150 cannot determine with reasonable certainty a classification type from the available classifications based upon the keyword combinations. In another embodiments, if the keywords within the document result in SmartFeedback application 150 determining multiple classification possibilities, then SmartFeedback application 150 may defer to the user to manually assign a classification by assigning the document the unclassified classification.

FIG. 4I illustrates an example screenshot of user options when viewing the document details screen of an unclassified document according to an embodiment. In an embodiment, the document ID 414 is displayed and the top of the unclassified document screen. In this example the unclassified document is called Invoice103.pdf. In an embodiment, the document ID 414 may be based on one or more keywords identified during the OCR process. In an embodiment the classification name 410 and the classification icon 416 may be displayed in the center of the screen so the user is aware of the current classification type. In this case, the classification name 410 is represented as "Unclassified" and the classification icon 416 is represented as a large question mark so as to signify to the user that the document is unclassified. In an embodiment, SmartFeedback application 132 may provide options to the user including, but not limited to, train document, move to, and delete.

In an embodiment, the train document option may include training SmartFeedback application 150 by updating keyword combinations and rules associated with existing classifications in the classification mapping database. The user may trigger the train document option by pressing the train document button 452. When the user selects the train document button 452, SmartFeedback application 132 may present the user with available classifications to assign to the unclassified document. When the user selects a classification, for example Invoice, SmartFeedback application 132 may send user selection data to SmartFeedback application 150, which includes the document ID 414, the selected classification, and a user training request.

In an embodiment, upon receiving the user selection data, which includes the user training request, SmartFeedback application 150 may update the classification mapping database for the selected classification type with particular keywords from the unclassified document. For example, if the user training request was directed to updating the classification type Invoice, then SmartFeedback application 150 may update the classification mapping database to include either additional keywords or additional rules based upon the identified keywords in the unclassified document.

In another embodiment, upon pressing the train document button 452 the user may be prompted to manually create a new classification based upon identified keywords and available keyword combinations and rules. For example, SmartFeedback application 132 may present the user with a list of possible keywords and available rules such that the user may manually create a new classification and create rules for the classification. Embodiments of manually selecting keywords and rules may include, but are not limited to, radio buttons, dropdown boxes and any other selection screen where the user may select multiple options in order to create rules based upon Boolean conditions and the available keywords. In another embodiment, SmartFeedback application 132 may trigger SmartFeedback application 150 to implement machine learning to improve the document classification determination based upon user selections. Embodiments of machine learning techniques are discussed in more detail hereinafter.

Referring back to FIG. 4I, the user has options to manually move the unclassified document or delete the unclassified document from the pending documents. In an embodiment, the move to button 454, when selected, allows the user to manually select a classification type or destination folder without updating how existing classification mapping is used by SmartFeedback application 150. In an embodiment, the move to button 454 may implement techniques previously discussed in the user change request section. In an embodiment deleting an unclassified document may be accomplished by pressing the delete button 424, as discussed in the user delete request section.

E. Document Error

In an embodiment, SmartFeedback application 132 may display a pending document as an "error", which may occur if SmartFeedback application 150 was unable to perform document analytics on the pending document. In an embodiment, an error may occur if the OCR process was unable to identify any usable keywords. In this scenario, SmartFeedback application 150 would be unable to perform document analytics because the pending document does not have any keywords to analyze.

FIG. 4J depicts an example document details page where the pending document was flagged as an error according to an embodiment. In an embodiment, error message 456 is a notification to the user that the pending document was unable to be processed by SmartFeedback application 150. Error details 458 may be display a detailed message describing why the document scan resulted in an error. For example error details 458 states that the "Document is unable to process due to unreadable text. Please check your scanned document." In an embodiment, the classification icon 416 may be represented with an exclamation point so as to alert the user of the severity of the issue. Other embodiments may implement higher priority indicators such as audible beeps or vibrations from mobile device 130. In an embodiment, error code 460 may display a configured numerical designation for the type of error that occurred. By using the error code 460, the user may be able to quickly assess the type of error without having investigate further or read the more detailed error details 458.

In an embodiment, the document details page may present the user with a clear message button 462 that allows the user to clear the pending document from the list 408. This option may be useful if the user is aware of particular documents that produce the error and wishes to simply remove the message from the list 408.

F. Machine Learning

In an embodiment, classification 160 may include the use of a machine learning tool that uses prior classifications and confirmations to increase the accuracy of classification determination. The machine learning tool may comprise digitally programmed logic that performs pattern matching and document analysis. For example, if a user continually selects the Invoice classification for certain documents that contain the keywords "invoice" and "claim," classification 160 may stop associating the Claim classification type when both keywords are found in a document. If a user later selects the Claim classification type for a document that contains both keywords, classification 160 may begin associating the Claim classification type again. The machine learning tool may also perform more complex analyses, such as matching document types, finding additional language in the documents that narrow the options, or comparing all documents classified to a single classification type for similarities.

Matching classifications may include comparing multiple documents to find a pattern in the locations of specific strings. For example, patient information forms that are filled out by a patient will always contain matching words in matching locations, such as "Personal Information," "Name," "Address," "Do You Have Any of the Following Allergies," etc. The machine learning tool may match determine that forms with matching patterns are frequently selected to be classified to the same classification type. For example, the machine learning tool may determine that documents with the pattern of a patient information form are always assigned to the Medical classification type. In some embodiments, the pattern recognition is used in a more complex manner, such as to determine one of multiple sub-classifications to assign a document. For example, if the patient information forms are frequently classified to both the general administrative classification type and a separate classification type which is dependent on the patient's name, classification 160 may select the general administrative classification type based on the pattern matching and a doctor specific administrative type based on the patient's name. As another example, the patient's name may be used to select a classification for the patient while the pattern matching may be used to select a sub-classification, such as Patient Information.

Finding additional language in the documents that narrow the options may include finding words that make it more likely that a document is classified as one type or less likely that a document is classified as another type. For example, classification 160 may determine that documents containing the phrase "social security number" are rarely classified as a scheduling type. Classification 160 may choose to not display an option for the scheduling type if "social security number" is found in the document, regardless of other keywords found in the document. Additionally, classification 160 may determine that documents with the phrase "Resident Dorian" are frequently classified to the type "John Dorian" and/or his supervisor "Dr. Perry Cox." If a keyword is found in a document that is mapped to a large number of doctors, classification 160 may use the phrase "Resident Dorian" to narrow the selection to the aforementioned classifications.

In an embodiment, the keyword combinations also contain rankings for the keywords. The rankings may be used to narrow down a group of selected classifications, to order the group of selected classifications, or to choose specific classifications from the group of selected classifications to which to classify the document. For example, the keyword "invoice" may be mapped with a higher ranking than the keyword "claim." If both keywords are found in the document, the word "invoice" would take priority. In some embodiments, the priority of "invoice" would mean that the document is automatically classified as classification type Invoice. In other embodiments, the priority of "invoice" would mean that the classification type Invoice would be placed higher on the list of selected classifications than the classification type Claim.

In some embodiments, the frequency of a keyword may be used to narrow down a group of selected classifications, to order the group of selected classifications, or to choose a specific classification from the group of selected classifications. For example, a document that contains the words "page" and "scene" may be classified as a Media Review classification type over other classifications, such as Books, if the word "scene" is identified a large number of times and the word "page" is identified only a few times.

Weightings may also be used to narrow down a group of selected classifications, to order the group of selected classifications, or to choose a specific classification from the group of selected classifications. Weightings may refer to the relative importance of a specific keyword. If only one instance of each keyword is found, the weightings may be indistinguishable from rankings. If multiple instances of each keyword are found, the weightings may be used to determine a ranking of destinations. For example, in the media review classification example, the word "scene" may have a relatively low weighting due to the fact that many forms of media refer to scenes. "Page," on the other hand, may have a relatively high weighting due to the fact that pages are rarely discussed in connection with forms of media other than books. Thus, a document may use the word "scene" more frequently than the word "page," but the weightings for the words may cause classification 160 to rank the Books classification type higher than the TV/Movies classifications type. Weightings may be used with, or without, machine learning.

VIII. IMPLEMENTATION EXAMPLES

Although the flow diagrams of the present application depict a particular set of steps in a particular order, other implementations may use fewer or more steps, in the same or different order, than those depicted in the figures. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
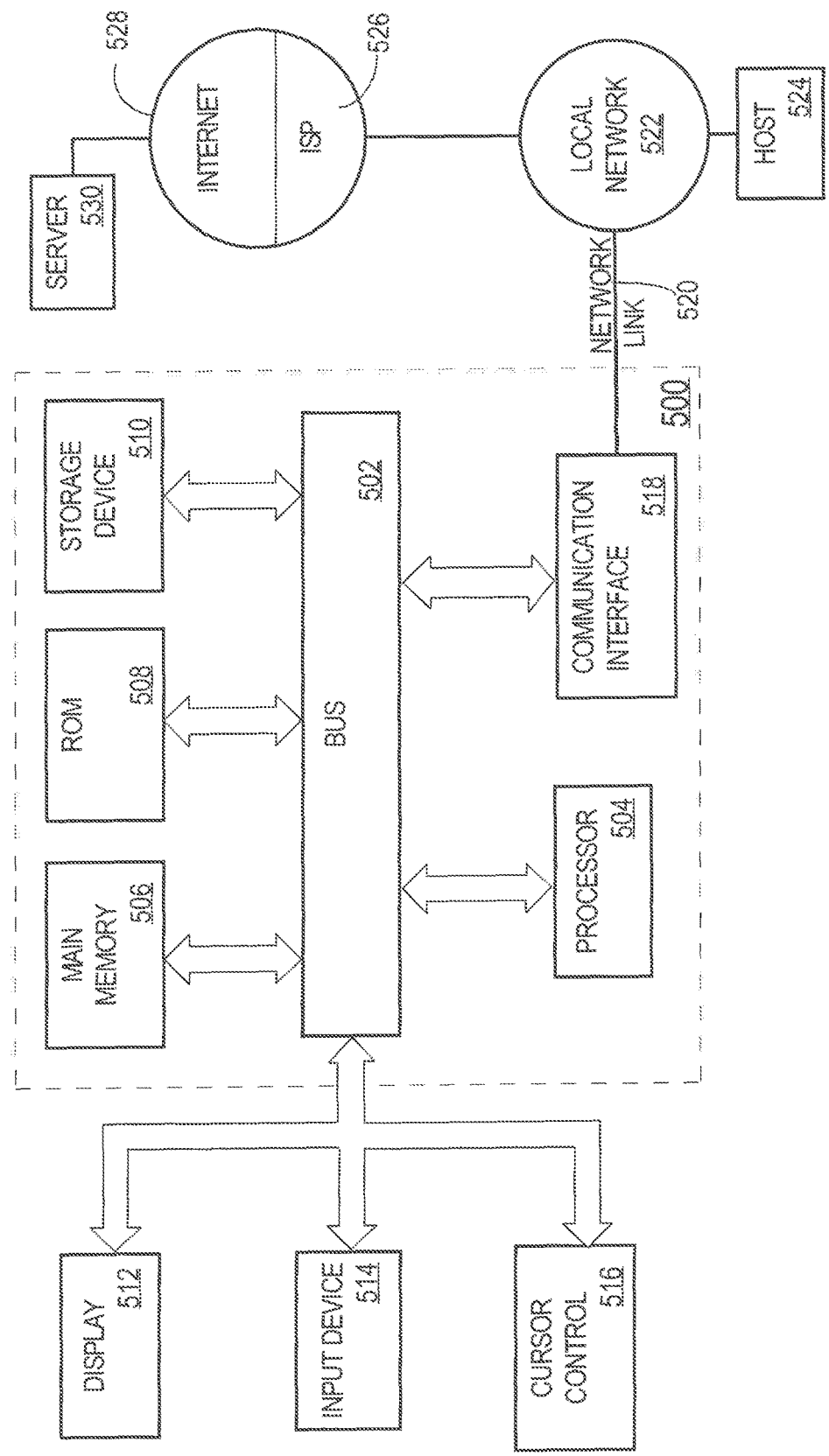
FIG. 5 is a block diagram that depicts an example computer system upon which embodiments may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution, or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment, those techniques are performed by computer system 500 in response to processor 504 processing instructions stored in main memory 506. Such instructions may be read into main memory 506 from another non-transitory computer-readable medium, such as storage device 510. Processing of the instructions contained in main memory 506 by processor 504 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 500, various computer-readable media are involved, for example, in providing instructions to processor 504 for execution. Such media may take many forms, including but not limited to, non-volatile and volatile non-transitory media. Non-volatile non-transitory media includes, for example, optical or magnetic disks, such as storage device 510. Volatile non-transitory media includes dynamic memory, such as main memory 506. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 504. For example, the instructions may initially be stored on a storage medium of a remote computer and transmitted to computer system 500 via one or more communications links. Bus 502 carries the data to main memory 506, from which processor 504 retrieves and processes the instructions. The instructions received by main memory 506 may optionally be stored on storage device 510 either before or after processing by processor 504.

Computer system 500 also includes a communication interface 518 coupled to bus 502. Communication interface 518 provides a communications coupling to a network link 520 that is connected to a local network 522. For example, communication interface 518 may be a modem to provide a data communication connection to a telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be processed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media for performing actions on electronic documents on computing devices, the one or more non-transitory computer-readable media storing instructions which, when processed by one or more processors, cause:

generating and providing to a client computing device that is separate from a computing device, by an application executing on the computing device, user interface data which, when processed at the client computing device provides a user interface with controls that allow a user to:

define a processing rule that corresponds to a classification for electronic documents, specify, for the processing rule that corresponds to the classification for electronic documents, an action to be performed by the processing rule on the electronic documents, and specify, for the processing rule that corresponds to the classification for electronic documents, one or more conditions under which the processing rule is to be applied to the electronic documents, wherein the one or more conditions include one or more include keywords and one or more exclude keywords, and wherein both the one or more include keywords must be included in the electronic documents and the one or more exclude keywords must not be included in the electronic documents for the processing rule to be applied to the electronic documents;

receiving, by the application, OCR data for an electronic document;

classifying, by the application, based upon contents of the OCR data, the electronic document to determine that the classification for electronic documents corresponds to the electronic document;

determining, by the application, the processing rule that corresponds to the classification for electronic documents that corresponds to the electronic document and the one or more conditions under which the processing rule is to be applied;

determining, by the application, whether the one or more conditions under which the processing rule is to be applied are satisfied, including whether both the one or more include keywords are included in the electronic document and the one or more exclude keywords are not be included in the electronic document;

in response to determining, by the application, that the one or more conditions under which the processing rule is to be applied are satisfied, including that both the one or more include keywords are included in the electronic document and the one or more exclude keywords are not be included in the electronic document:
identifying, by the application, the action to be performed by the processing rule that corresponds to the classification for the electronic document; and
performing, by the application, the action on the electronic document; and in response to determining, by the application, that the one or more conditions under which the processing rule is to be applied are not satisfied, not performing the action on the electronic document.

2. The one or more non-transitory computer-readable media of claim 1, wherein:
the user interface allows a user to specify for the processing rule a workflow that includes two or more actions, and
performing, by the application, the action on the electronic document includes performing the two or more actions included in the workflow on the electronic document.

3. The one or more non-transitory computer-readable media of claim 1, wherein:
the processing rule is a first processing rule that has a first assigned priority,
a second processing rule that has a second assigned priority also corresponds to the classification for the electronic document, wherein the second processing rule is different than the first processing rule,
determining, by the application, a processing rule that corresponds to the classification for electronic documents corresponds to the electronic document includes comparing the first assigned priority of the first processing rule to the second assigned priority of the second processing rule to select the first processing rule based upon the first processing rule having a higher priority than the second processing rule.

4. The one or more non-transitory computer-readable media of claim 1, wherein:
the classification for the electronic document is a first classification,
the classifying, by the application, based upon contents of the OCR data, the electronic document to determine a classification for the electronic document includes:
determining a second classification for the electronic document that is different than the first classification, wherein the first classification has a first assigned priority and the second classification has a second assigned priority, and
determining the first classification to be the classification for the electronic document based upon the first classification having a higher priority than the second classification.

5. The one or more non-transitory computer-readable media of claim 1, wherein:
the processing rule that corresponds to the classification for the electronic document corresponds to a first logical group,
a different processing rule corresponds to the classification for the electronic document and corresponds to a second logical group that is different than the first logical group.

6. An apparatus for performing actions on electronic documents on computing devices, the apparatus comprising:
one or more processors; and
one or more non-transitory computer-readable media storing instructions which, when processed by the one or more processors, cause:
generating and providing to a client computing device that is separate from a computing device, by an application executing on the computing device, user interface data which, when processed at the client computing device provides a user interface with controls that allow a user to:
define a processing rule that corresponds to a classification for electronic documents,
specify, for the processing rule that corresponds to the classification for electronic documents, an action to be performed by the processing rule on the electronic documents, and
specify, for the processing rule that corresponds to the classification for electronic documents, one or more conditions under which the processing rule is to be applied to the electronic documents, wherein the one or more conditions include one or more include keywords and one or more exclude keywords, and wherein both the one or more include keywords must be included in the electronic documents and the one or more exclude keywords must not be included in the electronic documents for the processing rule to be applied to the electronic documents;
receiving, by the application, OCR data for an electronic document;
classifying, by the application, based upon contents of the OCR data, the electronic document to determine that the classification for electronic documents corresponds to the electronic document;
determining, by the application, the processing rule that corresponds to the classification for electronic documents that corresponds to the electronic document and the one or more conditions under which the processing rule is to be applied;
determining, by the application, whether the one or more conditions under which the processing rule is to be applied are satisfied, including whether both the one or more include keywords are included in the electronic document and the one or more exclude keywords are not be included in the electronic document;
in response to determining, by the application, that the one or more conditions under which the processing rule is to be applied are satisfied, including that both the one or more include keywords are included in the electronic document and the one or more exclude keywords are not be included in the electronic document:
identifying, by the application, the action to be performed by the processing rule that corresponds to the classification for the electronic document; and
performing, by the application, the action on the electronic document; and
in response to determining, by the application, that the one or more conditions under which the processing rule is to be applied are not satisfied, not performing the action on the electronic document.

7. The apparatus of claim 6, wherein:
the user interface allows a user to specify for the processing rule a workflow that includes two or more actions, and
performing, by the application, the action on the electronic document includes performing the two or more actions included in the workflow on the electronic document.

8. The apparatus of claim 6, wherein:
the processing rule is a first processing rule that has a first assigned priority,
a second processing rule that has a second assigned priority also corresponds to the classification for the electronic, document, wherein the second processing rule is different than the first processing rule,
determining, by the application, a processing rule that corresponds to the classification for the electronic document includes comparing the first assigned priority of the first processing rule to the second assigned priority of the second processing rule to select the first processing rule based upon the first processing rule having a higher priority than the second processing rule.

9. The apparatus of claim 6, wherein:
the classification for electronic documents is a first classification,
the classifying, by the application, based upon contents of the OCR data, the electronic document to determine that the classification for electronic documents corresponds to the electronic document includes:
determining a second classification for the electronic document that is different than the first classification, wherein the first classification has a first assigned priority and the second classification has a second assigned priority, and
determining the first classification to be the classification for the electronic document based upon the first classification having a higher priority than the second classification.

10. The apparatus of claim 6, wherein:
the processing rule that corresponds to the classification for the electronic document corresponds to a first logical group,
a different processing rule corresponds to the classification for the electronic document and corresponds to a second logical group that is different than the first logical group.

11. A computer-implemented method for performing actions on electronic documents on computing devices, the computer-implemented method comprising:
generating and providing to a client computing device that is separate from a computing device, by an application executing on the computing device, user interface data which, when processed at the client computing device provides a user interface with controls that allow a user to:
define a processing rule that corresponds to a classification for electronic documents,
specify, for the processing rule that corresponds to the classification for electronic documents, an action to be performed by the processing rule on the electronic documents, and
specify, for the processing rule that corresponds to the classification for electronic documents, one or more conditions under which the processing rule is to be applied to the electronic documents, wherein the one or more conditions include one or more include keywords and one or more exclude keywords, and wherein both the one or more include keywords must be included in the electronic documents and the one or more exclude keywords must not be included in the electronic documents for the processing rule to be applied to the electronic documents;
receiving, by the application, OCR data for an electronic document;
classifying, by the application, based upon contents of the OCR data, the electronic document to determine that the classification for electronic documents corresponds to the electronic document;
determining, by the application, the processing rule that corresponds to the classification for electronic documents that corresponds to the electronic document and the one or more conditions under which the processing rule is to be applied;
determining, by the application, whether the one or more conditions under which the processing rule is to be applied are satisfied, including whether both the one or more include keywords are included in the electronic document and the one or more exclude keywords are not be included in the electronic document;
in response to determining, by the application, that the one or more conditions under which the processing rule is to be applied are satisfied, including that both the one or more include keywords are included in the electronic document and the one or more exclude keywords are not be included in the electronic document:
identifying, by the application, the action to be performed by the processing rule that corresponds to the classification for the electronic document; and
performing, by the application, the action on the electronic document; and
in response to determining, by the application, that the one or more conditions under which the processing rule is to be applied are not satisfied, not performing the action on the electronic document.

12. The computer-implemented method of claim 11, wherein:
the user interface allows a user to specify for the processing rule a workflow that includes two or more actions, and
performing, by the application, the action on the electronic document includes performing the two or more actions included in the workflow on the electronic document.

13. The computer-implemented method of claim 11, wherein:
the processing rule is a first processing rule that has a first assigned priority, a second processing rule that has a second assigned priority also corresponds to the classification for the electronic, document, wherein the second processing rule is different than the first processing rule, determining, by the application, a processing rule that corresponds to the classification for the electronic document includes comparing the first assigned priority of the first processing rule to the second assigned priority of the second processing rule to select the first processing rule based upon the first processing rule having a higher priority than the second processing rule.

14. The computer-implemented method of claim 11, wherein:

the classification for the electronic document is a first classification, the classifying, by the application, based upon contents of the OCR data, the electronic document to determine that the classification for electronic documents corresponds to the electronic document includes:

determining a second classification for the electronic document that is different than the first classification, wherein the first classification has a first assigned priority and the second classification has a second assigned priority, and determining the first classification to be the classification for the electronic document based upon the first classification having a higher priority than the second classification.

* * * * *